US011328059B2

(12) United States Patent
Rudnik

(10) Patent No.: US 11,328,059 B2
(45) Date of Patent: May 10, 2022

(54) CLOUD-BASED TAMPER DETECTION

(71) Applicant: McAfee, LLC, San Jose, CA (US)

(72) Inventor: Lior Rudnik, San Jose, CA (US)

(73) Assignee: McAfee, LLC, San Jose, CA (US)

( * ) Notice: Subject to any disclaimer, the term of this patent is extended or adjusted under 35 U.S.C. 154(b) by 23 days.

(21) Appl. No.: 16/730,149

(22) Filed: Dec. 30, 2019

(65) Prior Publication Data

US 2021/0200864 A1  Jul. 1, 2021

(51) Int. Cl.
G06F 21/55 (2013.01)
H04L 29/06 (2006.01)
G06F 21/56 (2013.01)

(52) U.S. Cl.
CPC .......... G06F 21/554 (2013.01); G06F 21/567 (2013.01); H04L 63/20 (2013.01); *G06F 2221/033* (2013.01)

(58) Field of Classification Search
CPC ....... G06F 21/554; G06F 21/567; H04L 63/20
See application file for complete search history.

(56) References Cited

U.S. PATENT DOCUMENTS

| | | | | |
|---|---|---|---|---|
| 10,547,560 | B1* | 1/2020 | Patel | H04L 43/0852 |
| 10,805,271 | B2* | 10/2020 | Savintsev | H04L 63/1416 |
| 11,019,095 | B2* | 5/2021 | Grill | H04L 63/1433 |
| 11,093,605 | B2* | 8/2021 | Zawadowskiy | G06F 9/30145 |
| 11,201,877 | B2* | 12/2021 | Bartos | G06N 3/08 |
| 2016/0285914 | A1* | 9/2016 | Singh | G06F 21/00 |
| 2019/0342315 | A1* | 11/2019 | Smelov | H04L 43/06 |
| 2020/0089887 | A1* | 3/2020 | Luthra | G06N 20/20 |
| 2020/0204569 | A1* | 6/2020 | Komarek | G06K 9/6269 |
| 2020/0280536 | A1* | 9/2020 | Kleopa | H04L 47/2483 |
| 2020/0302050 | A1* | 9/2020 | Jain | H04L 63/0884 |
| 2020/0374324 | A1* | 11/2020 | Le Strat | G06Q 10/103 |
| 2020/0412744 | A1* | 12/2020 | Spurlock | G06N 7/005 |
| 2021/0117544 | A1* | 4/2021 | Kurtz | G06F 21/567 |

* cited by examiner

*Primary Examiner* — Viral S Lakhia
(74) *Attorney, Agent, or Firm* — Patent Capital Group

(57) ABSTRACT

There is disclosed in one example a computing apparatus, including: a hardware platform including a processor and a memory; a user application; telemetry probes to collect telemetry about use of the user space application; a detection proxy to collect telemetry data from the telemetry probes and forward the telemetry data to a detection cloud service; and logic to receive from the detection cloud service a detection message that the user application has exhibited behavior consistent with tampering, and to take remedial action responsive to the detection message.

20 Claims, 12 Drawing Sheets

CLOUD-BASED TAMPER DETECTION

FIELD OF THE SPECIFICATION

This application relates in general to computer security, and more particularly, though not exclusively, to providing a system and method for cloud-based tamper detection.

BACKGROUND

Some applications provide tamper prevention to ensure that the software has not been tampered with.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
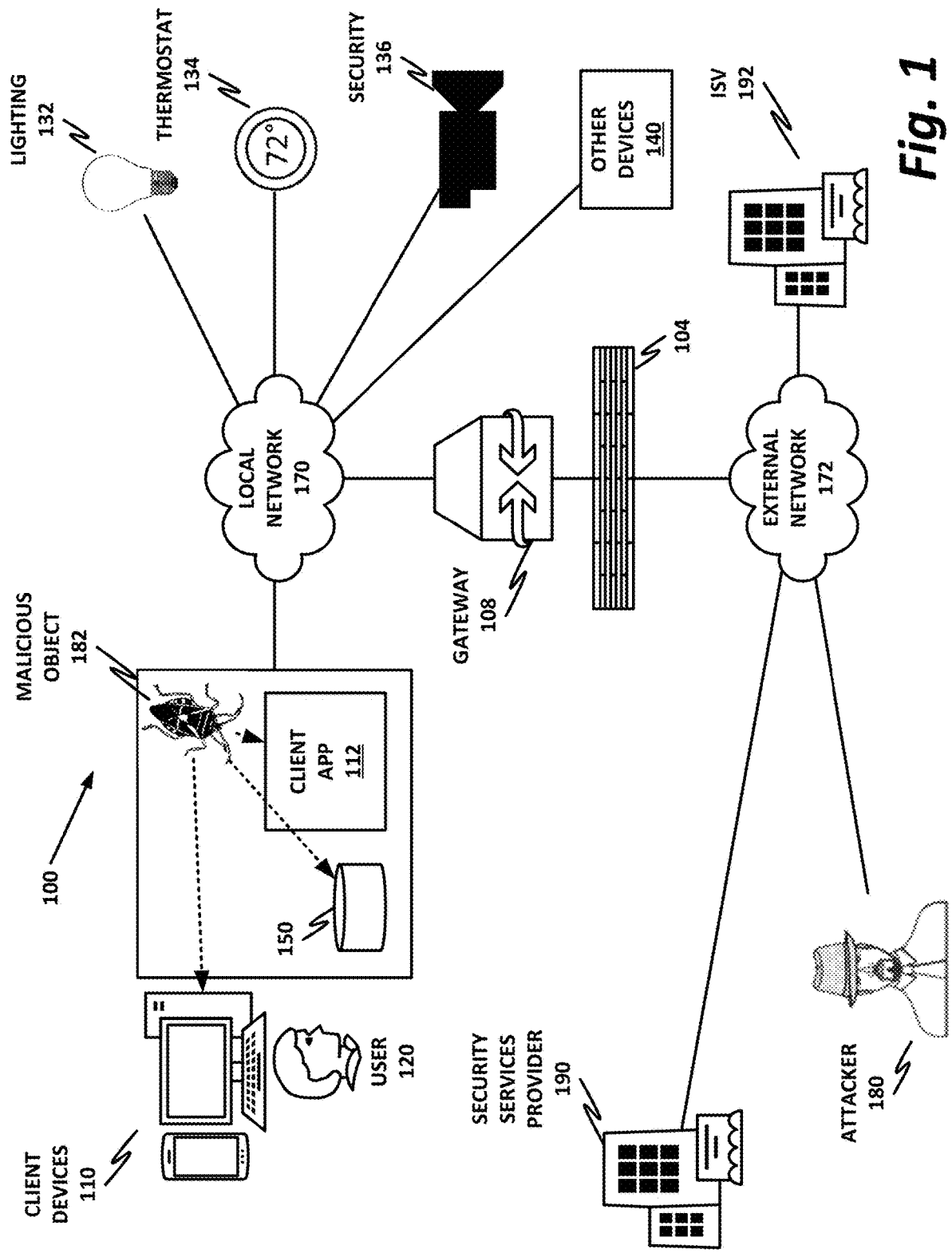
FIG. 1 is a block diagram of selected elements of a security ecosystem.

In an example, there is disclosed a computing apparatus, comprising: a hardware platform comprising a processor and a memory; a user application; telemetry probes to collect telemetry about use of the user space application; a detection proxy to collect telemetry data from the telemetry probes and forward the telemetry data to a detection cloud service; and logic to receive from the detection cloud service a detection message that the user application has exhibited behavior consistent with tampering, and to take remedial action responsive to the detection message.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Software vendors may wish to make their software tamper resistant for various reasons. Tamper resistance may be provided, for example, to ensure that the software does not pose a security risk to the end user. In other cases, tamper resistance may be provided to ensure that a copy of the software is authentic or authorized, or that other requirements have been met. For example, developers and businesses may lose money to software piracy, in which software is illegally downloaded and/or modified to gain access to the functionality of the software without paying for it. In some cases, the software vendor may provide a free or "shareware" version of the software that is usable for a limited time, or with other restrictions, until the user pays for the software. After the time expires, the user may lose access to the software, or the software may have a limited feature set. When end users tamper with the software, they can gain access to the software without paying for it, which can substantially harm the ability of the developer to be paid for developing the software.

Tampering can also result in the compromise of end users' private data, including financial data and other sensitive data. Modified software may be used to collect these data and provide them to unauthorized third parties. Furthermore, a software developer or other enterprise may have its brand and/or business reputation harmed when tampered versions of software and applications are provided without regulation.

Anti-tamper software, or tamper resistant software, is software that makes it more difficult for an end user or malicious user to modify the software. The tamper resistance may take the form of active and/or passive measures. This can include passive measures such as obfuscation to make reverse engineering more difficult, encryption to make it difficult for users to gain access to plaintext data, or other techniques to raise the bar for tampering.

Active tamper detection techniques may be used to cause a program to malfunction or cease operating if it is modified. Tamper resistance may include or share characteristics with copy protection and trusted hardware, although conceptually they may not be identical. Rather, anti-tampering techniques may be used in conjunction with copy protection and trusted hardware to provide a total protection ecosystem.

There are not currently any known, provably secure anti-tampering methods. Thus, as long as the end user has access to and control over the software endpoint, it is possible (even if it is difficult) for the user to tamper with the software.

Anti-tampering mechanisms may be either internal to the software, or external to the software. Internal anti-tampering means that the software provides its own internal security. This may be done with specific code that detects the tampering as the tampering occurs. Techniques in internal anti-tampering include, by way of illustrative and nonlimiting example, integrity checks, hashing, check summing, blocking debuggers, encryption, and obfuscation. Some modern software also runs within its own virtual machine, which further helps to prevent tampering by end users. In other embodiments, software may use white-box cryptography, wherein cryptography keys are not revealed even when cryptographic computations are observed in complete detail in a debugger. In yet another example, tamper tolerant software may detect tampering and then reverse its effects, so that even after the software has been tampered with, it runs as though it had never been modified.

External anti-tampering may take the form of an external application monitoring the protected application for tampering. This is similar to the protection provided by malware scanners and antivirus scanners. In the external case, the monitoring application watches the software to detect whether its functionality or code have been changed. In the case of infection, appropriate action may be taken, including disabling the software, notifying the software vendor, or returning the software to its original, untampered state.

This anti-tampering software is useful in many different kinds of software applications, including, by way of illustrative and nonlimiting example, embedded systems, realtime systems, industrial control applications, financial applications, mobile software, network appliance systems, anti-cheating mechanisms for games, secure software, military or classified software, license management, and digital rights management (DRM) systems. In some cases, malware itself may employ anti-tampering mechanisms to help defeat anti-malware scanners.

One drawback to anti-tampering systems is that, so long as the user has access to and control over the final form of the software, there is no provable way to ensure that the software has not been tampered with. Although many techniques can be used to make it more difficult for the user to tamper with, ultimately control over the software is out of the hands of the software developer. However, much existing software already has an online component. This includes software as a service, games that connect to a server, software that downloads updates, software that provides integrated web services, or any other software where at least some of the functionality is located offline. Advantageously, when at least some functionality is located offline, the end user does not have full control over the software endpoint, and thus it is possible to provide anti-tampering techniques that are not within the control of the end user.

Consider, for example, the illustrative case of an online game. This case and other illustrative cases may be used throughout this specification as an illustration of the operative principles of the present teachings. These illustrations should not, however, be understood to be limiting or exclusive. Rather, these examples are provided to illustrate operational principles of the present disclosure. The principles described herein may be expanded to cover other cases within the spirit and scope of the disclosure.

For purposes of illustration, a fictional game called KnightQuest will be used as an illustrative example. The end user downloads a KnightQuest client to run on his or her local computing device. Although some functionality is provided by the local KnightQuest client, a large portion of the functionality is provided by the KnightQuest server. For example, the KnightQuest server renders a virtual world, provides non-player characters (NPCs), manages the user's interaction with other player characters, issues quests, and tracks the user's progress. The local endpoint, however, may provide functionality such as a login, access to the user's stored online persona, and verification, local rendering, and local display.

Over time, the developer of KnightQuest may heuristically determine a "normal" behavioral profile for the KnightQuest client. For example, when the user logs into the game, he provides both his username and password in a login form, and then clicks a login button. The KnightQuest client then sends the username and password combination to the server, and receives a verification code. Once the user has been authenticated and verified, the KnightQuest server instructs the client to render the user's last location, as well as the user's equipment and attributes. The KnightQuest client may then send instructions to the KnightQuest server indicating the user's ongoing actions with the virtual world. Over time, a heuristic model may be developed to indicate a normal interaction. For example, within a short time of the user's login, the KnightQuest client may send a request for a rendering of the user's last location and a listing of the user's equipment and attributes. A heuristic model may be developed to indicate that in normal usage, these requests from the KnightQuest client come within approximately 300 milliseconds of receiving the successful login token. The login token may include an encryption or decryption key that is used for secure communication between the client and the server.

Because a substantial portion of the KnightQuest functionality is provided on the server side, the server is positioned to provide anti-tampering services. For example, if the KnightQuest client requests authentication, and does not send the request for the user's last location, equipment, and statistics at approximately 300 milliseconds, but rather sends the request three minutes later, this would indicate a substantial deviation from the normal behavior. This substantial deviation may occur, for example, because the end user is using a debugger to analyze the data stream received from the KnightQuest server to attempt to tamper with the game, for example to gain unauthorized, unpaid access to the server, to increase the user's attributes, statistics, or equipment, or to otherwise tamper with the gaming experience without authority. This can not only deprive the KnightQuest operator of legitimate revenue streams, but can also give the end user who is tampering an unfair advantage with respect to other end users who are playing the game fairly.

Another example of a deviation from the norm may be an unusual sequence of events. For example, if the KnightQuest server receives a request for user attributes, equipment, and location with a valid identification token, but the server did not receive a preceding request for authentication, this could represent an unusual or unknown behavior pattern. Embodiments of the system described herein move detection of tampering events from the local endpoint to the cloud. Advantageously, the end user cannot tamper with the detection mechanism itself, because the end user does not have control over that detection mechanism. Furthermore, the cloud-based mechanism can, in some cases, focus on detection rather than prevention. Thus, rather than engaging in an arms race with end users to make tampering more and more difficult, the cloud-based service can detect the effects of tampering, and can then take appropriate remedial action on the cloud side. Continuous monitoring can be provided, and interference can be detected, in the normal application behavior as part of an attempt to tamper with or reverse engineer an application.

By detecting in the cloud, the software provider or cloud service provider can prevent attackers from circumventing efforts to eliminate tampering. At least some embodiments of the cloud-based detection mechanism focus on detection rather than on tamper prevention, or reverse engineering prevention.

Embodiments of the present specification use heuristics to learn the "normal" human usage patterns of the protected service, and then detect anomalies from that baseline. It should be noted that this does not necessarily require detection of tampering the first time it occurs. Rather, as the human user baseline evolves, the tampered endpoint may become more and more of an outlier (e.g., deviating from the standard or median by more and more standard deviations). As it becomes more evident that the tampered endpoint is an outlier, remedial action can be taken.

In some cases, the endpoint itself may have "sense points" that act as tripwires into the application when there is no human interaction available. These sense points may, for example, provide telemetry to the server even when there is not a specific interaction that should be looked for. Thus, with the use of sense points, unusual behavior (such as the use of a debugger that substantially slows down an application) may be detected even when there is no specific interaction with the cloud. Furthermore, although these sense points may reside on the endpoint where they are susceptible to tampering by a malicious actor, failure of the sense points may itself indicate a tampering event.

One feature of some tampering events is that once a user learns how to successfully tamper with the software, he may share that knowledge with others who also begin tampering with the software. For example, if one user "cracks" the security on a game to gain access to paid features without paying, or to unfairly enhance his advantage in the game, that user may share the hack with other players of the game.

The sensing mechanism of the present specification relies on the fact that, in many cases, tampering creates unusual behavior. For example, normal users do not run their applications under a debugger, with the resultant high latency and sometimes long delays in processing as the user inspects certain events. When running under a debugger, performance and the timing patterns of actions and sense points will deviate from the normal usage pattern. Thus, continuous monitoring, coupled with machine learning algorithms, may detect behaviors and malicious deviations from normal usage. A long-term history of behavioral patterns will also help to prevent false positives.

In some embodiments, two types of detection logic are run concurrently. The first is a tampering attempt detection, which is a near real-time detecting of interference and behavior. This is often detected via timing and skipping of sense points. The second is detection of successful tampering. This may be a more long-term process based on learning the normal behavior of users during a "learning period." In some cases, during the "learning period," on tampering attempts may be detected. On the other hand, some systems lack the necessary sense points to detect attempted tampering. Thus, joint detection of both provides comprehensive protection across many systems.

For example, in some embodiments, the system may run without sense points, such as where it is not possible to add them. In this case, it may only be possible to perform the successful tampering detection (e.g., detection after the fact). In systems where the learning period has not yet elapsed, tampering attempts may be detected via sense points.

In some embodiments, machine learning models, including deep learning, may be used to automatically "learn" valid patterns of usage of monitored systems. This enables the detection of deviations from "normal usage behavior." In other embodiments, similar results may be achieved via heuristics.

Logic for heuristic to detection may also include detecting the skipping of predetermined network calls or other sense points.

In the case of suspected network condition issues, it may also be possible to delay decision for significant time (e.g., for up to 24 hours depending on the geographic location) before deciding with high confidence that tampering has occurred. For example, if the user is located in a region with high incidence of network problems, then apparent tampering events may in fact be the result of poor network conditions. As the system continues to run over time and gains more knowledge about what a successful tampering attack "looks like," detection decisions can be adjusted and higher confidence can be achieved.

In the case of detecting attempted tampering, decisions may not necessarily be based on user behavior (which is a long-term consideration), but rather may be based on sense points and heuristics such as skipping of expected calls.

Sense points can include custom code inserted into the client-side of a monitored (back-end) system. The code may be inserted and may execute when there is no user interaction, such as while the application is initializing, closing down, and during other similar processes. The sense points may contain additional local system parameters (e.g., memory load, CPU load, battery if applicable, free local storage, network stability indicators, latency, bandwidth, and similar).

The sense point call order and timing are expected to be fairly standard for specified endpoints in a specified geographic location. When tampering attempts are made, it is expected to see significant delays in the timing between sense points. For example, the timing between certain procedure calls may go from an order of microseconds or milliseconds to an order of seconds or even minutes. This could indicate the use of a debugger. Furthermore, a clear missing call from a "middle" sense point in a sequence may also indicate an immediate tampering attempt.

Detection of successful tampering events may be based on machine learning models that "learn" the normal behavior of users based on available data. Depending on the context, this may be the only type of tampering detection that is available.

Detecting successful tampering may be based on a number of factors including:
  Order of calls, including the sense points in the regular API usage patterns.
  The average timing between sequential calls.
  The local system load parameters sent via sense points code (e.g., memory, CPU, storage, battery, or similar).
  Network conditions, such as latency, bandwidth, geographic location or similar, as reported by the sense points.
  Time of day, date, year.
  Geographic location.
  Continuous monitoring also enables the capture of patterns of change across time for various properties. Once the learning period is finished, major deviations from normal behavioral patterns may be marked as potentially successful tampering events. The system could also detect the spread of such deviations as the number of occurrences across endpoints increases. This increase of incidents may indicate an active campaign to spread the tampering, such as the spread of a "crack" for protected software.

The teachings of the present specification may be applicable to any online application, including mobile, webpages, or similar. In particular, the teachings are applicable where the application has a set of backend servers that allow monitoring of and sharing of API call activities (e.g., via URLs).

The teachings are also applicable to any public network service (or set of public APIs) having a set of internal (nonpublic) back-end servers that allow monitoring of internal API call activity. In cases where the services do not support easily adding sense point code, it may be more difficult to detect tampering attempts. However, successful tampering attacks can still be detected in those cases.

A system and method for providing cloud-based tamper detection will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In at least some embodiments, security ecosystem 100 may be configured or adapted to provide cloud-based tamper protection, according to the teachings of the present specification.

In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that features service function chaining (SFC) or network function virtualization (NFV), gateway 108 may be include one or more service functions and/or virtualized network functions.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources.

Client application 112 may in some examples be provided by an independent software vendor (ISV) 192. ISV 192 may provide software directly to client device 110, or may provide software via an app store or other ecosystem. In some cases, ISV 192 may want to ensure that user 120 cannot tamper with client application 112. For example, client application 112 may have certain page features that should only be accessible after the user has paid to unlock those features. Client application 112 could also include DRM, shareware features, or other protected features.

In addition to preventing user 120 from tampering with client application 112, it may be desirable to ensure that malicious object 182, deployed by attacker 180, does not tamper with client application 112. In this context, anti-tampering mechanisms may be used not only to avoid users accessing features without permission, but also may provide security. For example, if attacker 180 inserts malicious object 182 with the intention to compromise client application 112 so that client application 112 acts as a botnet for attacker 180's spamming purposes, this may be undesirable behavior. Furthermore, tampering could cause client application 112 to provide a backdoor to attacker 180, to send personal information from client device 110 to attacker 180, or to perform some other malicious work.

Many existing solutions focus on ensuring that neither user 120 nor attacker 180 can tamper with client application 112 by providing client-side anti-tampering mechanisms. This often becomes an arms race between ISV 192 and those attempting to tamper with client application 112. As attacks become more and more sophisticated, ISV 192 may provide more and more sophisticated anti-tampering mechanisms.

For example, in the early days of anti-tampering, software was protected with simple mechanical mechanisms, such as a pattern matching wheel. Before a user was allowed to access a game, the user was required to use the pattern matching wheel to enter a series of symbols. The pattern matching wheel could be photocopied, but it took more work to photocopy the pattern matching wheel and also mimic the turning behavior. However, a patient user could work out the symbols, even without turning a photocopied version. Thus, it was relatively straightforward for even a moderately patient non-expert user to defeat these types of mechanical anti-tampering mechanisms. Later efforts included requiring the user to enter a password or an unlock key provided by the ISV, or other anti-tampering mechanisms.

Other anti-tampering mechanisms include the use of Windows registry keys, timeouts, and other mechanisms that a relatively computer-savvy user can defeat without a great deal of trouble.

While some anti-tampering mechanisms are much more sophisticated than this, ultimately, an anti-tampering mechanism that resides solely on client device 110 is vulnerable to tampering. With sufficient information, a user can defeat these anti-tampering mechanisms.

Thus, it is advantageous to provide anti-tampering mechanisms that do not reside solely on client device 110, but that are hosted separately, such as services provided by security services provider 190. Security services provider 190 is provided as an example, but the anti-tampering services described herein could be provided by any suitable enterprise.

Note that anti-tampering may include both client-side and server-side anti-tampering mechanisms. For example, endpoint-based anti-tampering mechanisms may use passive mechanisms such as obfuscation to make reverse engineering difficult, or techniques that cause the program to malfunction or not operate if it is modified, such as the use of checksums. This type of anti-tampering shares certain characteristics with, but is not necessarily coextensive with, copy protection and trusted hardware. As of the date of this application, there are no known provably secure software anti-tampering methods.

Anti-tampering may be applied internally or externally to the application 112. External anti-tampering may be accomplished by monitoring software that detects tampering. This could include, for example, a common malware scanner or antivirus engine. In some cases, a malware scanner or antivirus engine may work cooperatively with an application backend and a detection proxy so that various different kinds of tampering can be detected, including malware tampering and user workarounds.

Endpoint-side tampering mechanisms may include integrity checks such as cyclic redundancy checks (CRCs), anti-debugging measures, encryption, obfuscation, execution within a virtual machine, and white-box cryptography.

Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known.

However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
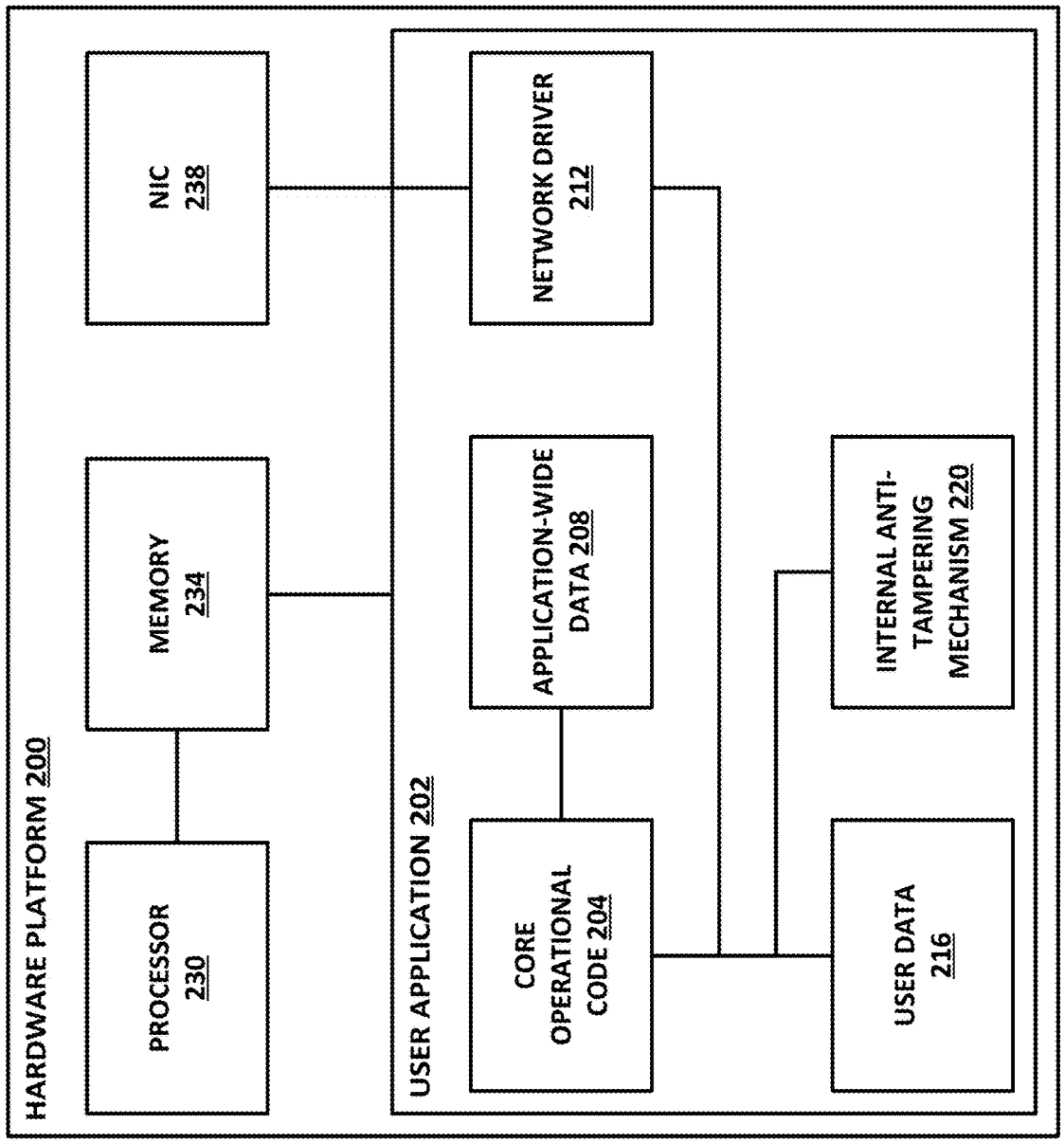
FIG. 2 is a block diagram illustration of a computing system, including a hardware platform.

FIG. 2 is a block diagram illustration of a computing system, including a hardware platform 200. Hardware platform 200 provides internal anti-tampering mechanism 220.

In this illustration, hardware platform 200 includes a processor 230, a memory 234, and a network interface card 238. Note that this provides a simplified view of a hardware platform to focus on certain elements of user application 202. Other illustrations throughout the specification provide a more detailed view of a hardware platform in various configurations.

In this example, memory 234 hosts a user application 202. Note that memory 234 could include a random access memory (RAM), a volatile or nonvolatile memory, a disk storage, or other levels of memory. At an appropriate time, such as upon execution by a user, processor 230 may load instructions into memory 234 for execution.

User application 202 includes various components illustrated as blocks in this example. These blocks illustrate a logical division of labor in the operations of user application 202, but are not intended to be exclusive, or mutually exclusive.

Core operational code 204 provides the core application functionality desired by the user. For example, if user application 202 is a video game, then core operational code 204 may provide the actual game for the user. If user application 202 is business software, engineering software, or some other software, core operational code 204 may provide that functionality. Core operational code 204 may access both application-wide data 208, which may include data that are general to the application such as libraries, databases, tables, and other data, as well as user data 216, which includes data that are specific to this particular instance. This division between application-wide data 208 and user data 216 is provided by way of illustrative and nonlimiting example, and other divisions of data may be provided in other examples.

In some cases, core operational code 204 may provide only endpoint-side operations, while other features are accessed by way of remote application program interfaces (APIs) via network driver 212, which communicatively couples to network interface card (NIC) 238.

For example, if user application 202 is a massively multiplayer online role-playing game (MMORPG), much functionality is provided via remote APIs. Core operational code 204 on hardware platform 200 may provide only limited functionality, such as rendering of images and videos, temporary storage, and handling of user input and output. The majority of the functionality may, in fact, be provided by a server operated by the ISV that provides a virtual world for the user to interact with, via user application 202.

In this illustration, user application 202 includes internal anti-tampering mechanisms 220. This could include both passive and active anti-tampering mechanisms, as described above. For example, internal anti-tampering mechanisms 220 could include the use of CRCs, anti-debugging measures, encryption, obfuscation, execution within a virtual machine, or other security measures.

As discussed above, if internal anti-tampering mechanism 220 stands alone in preventing tampering with user application 202, there is danger that a user or attacker can defeat the anti-tampering mechanism and gain access to unauthorized features, or otherwise compromise the program.

Figure 3:
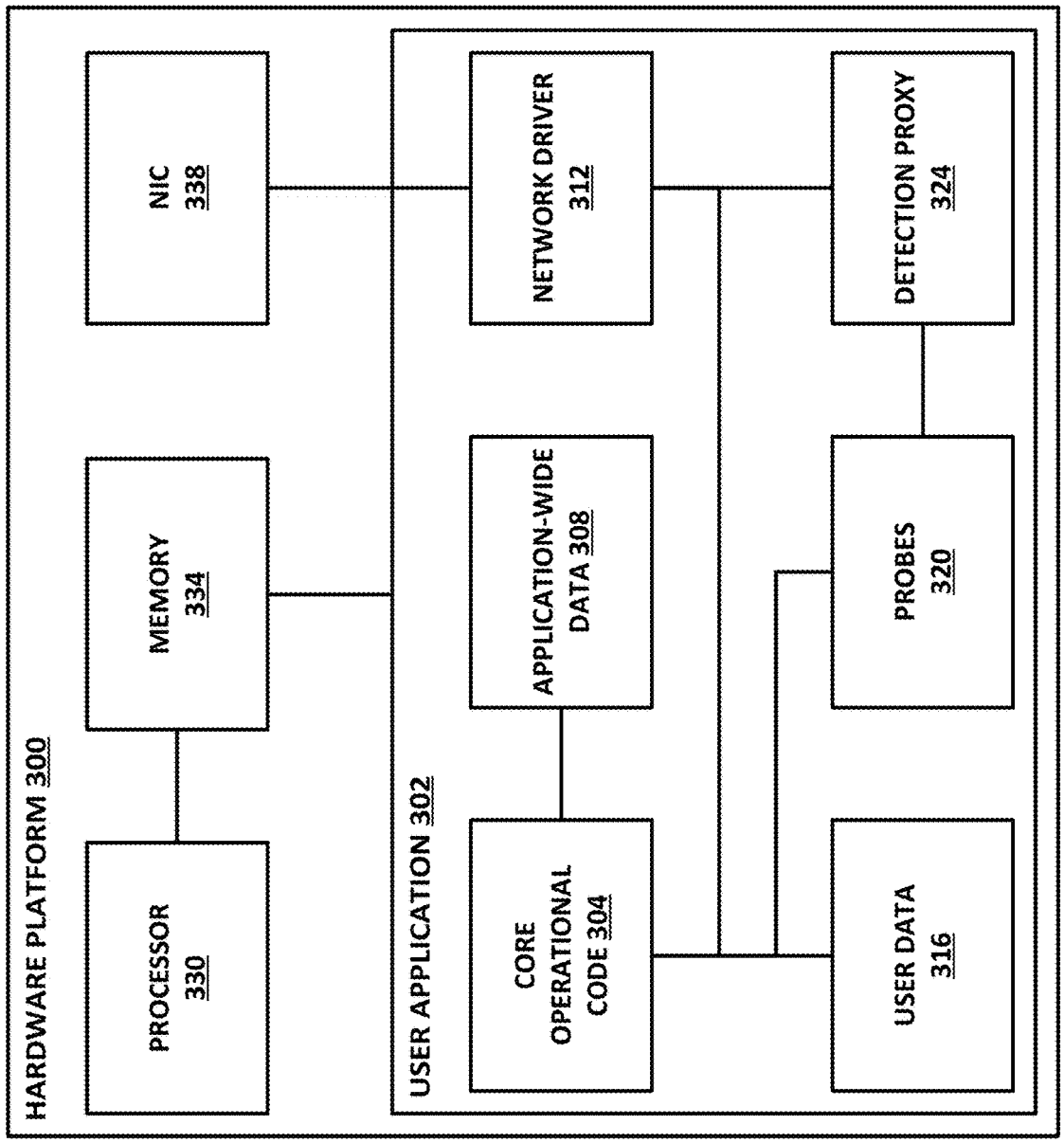
FIG. 3 illustrates a hardware platform that improves on the model illustrated in FIG. 2.

FIG. 3 illustrates a hardware platform 300 that improves on the model illustrated in FIG. 2.

In this illustration, hardware platform 300 includes a processor 330, a memory 334, and a network interface card 338. Note that this provides a simplified view of a hardware platform to focus on certain elements of user application 302. Other illustrations throughout the specification provide a more detailed view of a hardware platform in various configurations.

In this example, memory 334 hosts a user application 302. Note that memory 334 could include a RAM, a volatile or nonvolatile memory, a disk storage, or other levels of memory. At an appropriate time, such as upon execution by a user, processor 330 may load instructions into memory 334 for execution.

User application 302 includes various components illustrated as blocks in this example. These blocks illustrate a logical division of labor in the operations of user application 302, but are not intended to be exclusive, or mutually exclusive.

Core operational code 304 provides the core application functionality desired by the user. For example, if user application 302 is a video game, then core operational code 304 may provide the actual game for the user. If user application 302 is business software, engineering software, or some other software, core operational code 304 may provide that functionality. Core operational code 304 may access both application-wide data 308, which may include data that are general to the application such as libraries, databases, tables, and other data, as well as user data 316, which includes data that are specific to this particular instance. This division between application-wide data 308 and user data 316 is provided by way of illustrative and nonlimiting example, and other divisions of data may be provided in other examples.

In some cases, core operational code 304 may provide only endpoint-side operations, while other features are accessed by way of remote application program interfaces (APIs) via network driver 312, which communicatively couples to network interface card (NIC) 338.

For example, if user application 302 is an MMORPG, much functionality is provided via remote APIs. Core operational code 304 on hardware platform 300 may provide only limited functionality, such as rendering of images and videos, temporary storage, and handling of user input and output. The majority of the functionality may, in fact, be provided by a server operated by the ISV that provides a virtual world for the user to interact with, via user application 302.

In this case, user application 302 includes probes 320 that communicate with a detection proxy 324. For example, probes 320 may include hooks into various APIs used by user application 302. These hooks interact with detection proxy 324 to provide telemetry for a tamper detection service.

Note that while probes 320 and detection proxy 324 are shown as part of user application 302, there may be a division here. For example, in some cases it is desirable to provide a detection proxy 324 that is not part of core operational code 304. Thus, tampering detection may be provided even to an application that does not include native support. In this case, probes 320 may include hooks into API calls made by user application 302. Detection proxy 324 can then perform its function of forwarding metadata about those API calls to a detection tampering service. This can be useful, for example, in an enterprise where the enterprise wishes to use certain legacy software that does not natively provide anti-tampering support. In that case, even if the legacy software does not provide anti-tampering protection, the tampering detection service can detect tampering so that remedial action can be taken by an enterprise security or network administrator. In some cases, probes 320 and detection proxy 324 may form an application backend that may operate on the local hardware platform, but that may be separate from user application 302.

In some embodiments, detection proxy 324 may include additional features. For example, detection proxy 324 may include rules to block access from applications and/or users that have been found to tamper with an API.

Figure 4:
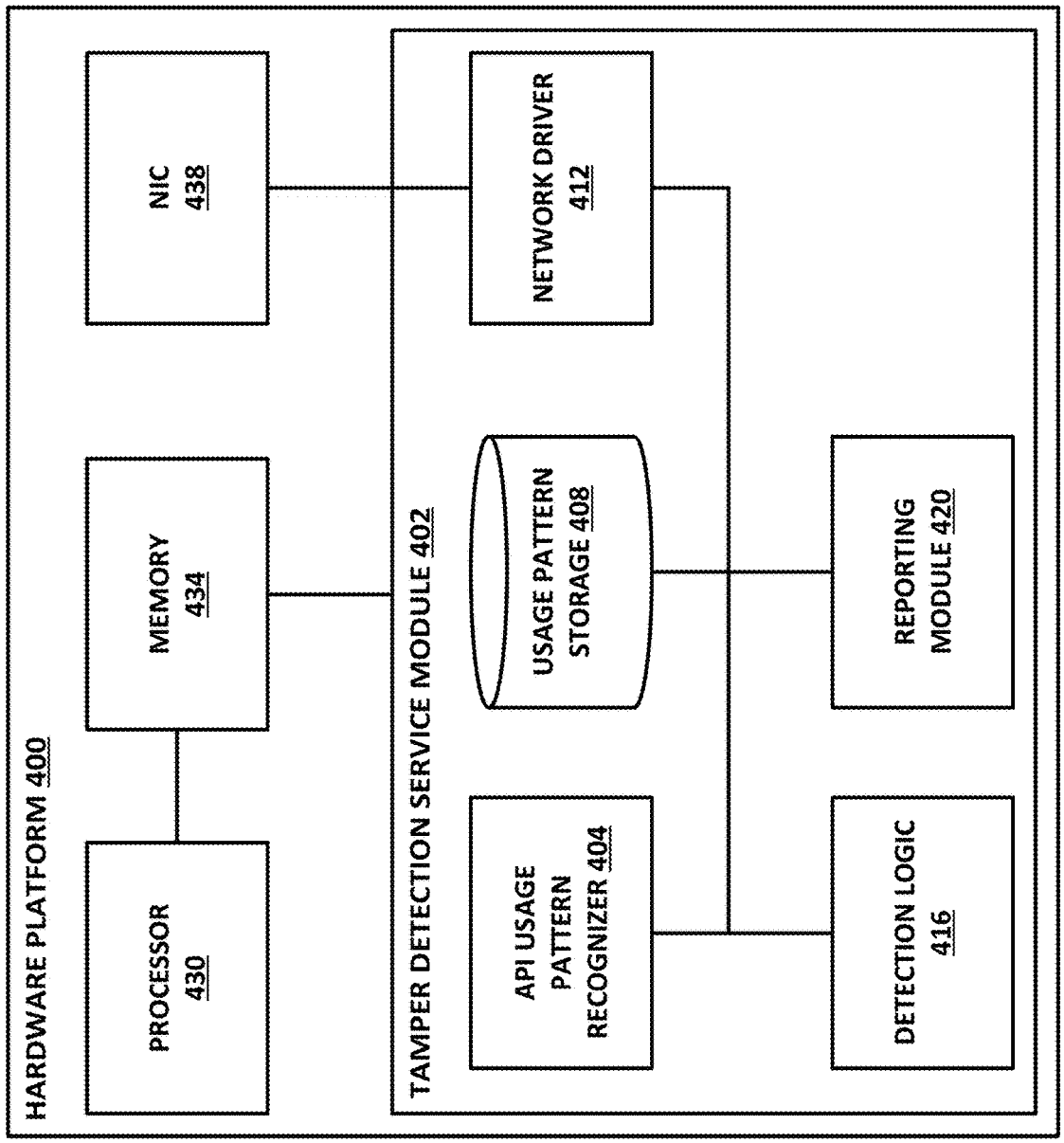
FIG. 4 illustrates a hardware platform that may include a tamper detection service module.

FIG. 4 illustrates a hardware platform 400 that may include a tamper detection service module 402.

In this illustration, hardware platform 400 includes a processor 430, a memory 434, and a network interface card 438. Note that this provides a simplified view of a hardware platform to focus on certain elements of a tamper detection service module 402. Other illustrations throughout the specification provide a more detailed view of a hardware platform in various configurations.

In this example, memory 434 hosts a tamper detection service module 402. Note that memory 434 could include a RAM, a volatile or nonvolatile memory, a disk storage, or other levels of memory. At an appropriate time, such as upon execution by a user, processor 430 may load instructions into memory 434 for execution.

Tamper detection service module 402 includes various components illustrated as blocks in this example. These blocks illustrate a logical division of labor in the operations of tamper detection service module 402, but are not intended to be exclusive, or mutually exclusive.

In this illustration, tamper detection service module 402 includes an API usage pattern recognizer 404. This may interact with usage pattern storage 408, which stores expected or heuristic usage patterns for the application under analysis. Tamper detection service module also includes network driver 412, which communicatively couples to NIC 438.

API usage pattern recognizer 404 operates in conjunction with detection logic 416 to identify unusual or out-of-bounds operation of an application. For example, out-of-bounds operations that may be detected by detection logic 416 could include, by way of illustrative and nonlimiting example, unusual traffic patterns, visiting unexpected uniform resource locators (URLs), visiting URLs out of order, inserting steps, deleting steps, unusual timing, unusual central processor unit (CPU) or memory usage, or other factors.

In the example of the KnightQuest game discussed above, the user may be required to provide a username and password combination before being authenticated to the server and then accessing online resources. API usage pattern recognizer 404 may track, either heuristically or via preprogrammed methods, expected usage patterns. For example, the client-side application may be expected to first provide a username, then provide a password, and then access the online world or online game resources for the KnightQuest game. If detection logic 416 determines that a client device is accessing the online game without first providing a username and password, this could be considered unusual.

Unusual timing could also be a factor. For example, if a user is operating the program in a debugger to decompile the application and find useful entry points for tampering with the application, there may be significant delays in the expected timing between certain requests. For example, if the client provides a username and password, and then waits a very long time to provide a request for online resources to render the virtual world, this could indicate that the user is operating the program within a debugger to identify entry points for tampering. On the other hand, if certain actions happen very quickly (such as interacting with the online virtual world at greater than human speed), then this could be an indication that the user is operating a scripting agent or other unauthorized mechanism to gain an advantage in the game.

Similarly, tampering may be indicated if additional steps are inserted into a workflow, certain steps are omitted from a workflow, timing between steps is unusual, steps are out of order, or other suspicious activities occur. Detection logic may analyze data streams from API usage pattern recognizer 404, and determine if any unusual patterns are identified.

Notably, detection logic 416 may, in some cases, focus largely on behavioral aspects of the application rather than focus specifically on anti-tampering mechanisms. This behavioral focus is useful for providing detection, even in the case where protection mechanisms fail. Thus, in some cases, an application such as user application 200 of FIG. 2 and user application 302 of FIG. 3 may include internal anti-tampering mechanisms, as appropriate. However, if these are defeated, then probes 320 of FIG. 3, via detection proxy 324, will forward data to tamper detection service module 402, which can then compare the behavior to expected behavior stored in usage pattern storage 408. If detection logic 416 detects unusual behavior, it may assign a score to the behavior. This behavior need not be identified as malicious in every case, especially in the first instance. For example, there may simply be a network lag or other delay that causes unusual timing, a user may simply perform some actions more quickly than necessary, or there may be some reordering of operations due to other factors. So, a single instance of unusual activity may not be immediately flagged as suspicious. However, repeated unusual activity may be flagged, and some activity may be deemed suspicious or malicious, per se.

For example, the KnightQuest online role-playing game may be expected to access only servers at subdomains of www.knightquest.com that provide the game, along with resources from an advertisement provider such as www.akamai.net. While advertisements may provide links to outside services, it is not expected for the KnightQuest game itself to load URLs other than URLs from these two locations. The first time that an instance of the game loads an unusual URL, this could be the result of an update that provides new resources. If a large number of clients load the same resource, and other suspicious activity does not occur, then this URL may be added to the heuristic algorithm as an authorized URL. However, a client that begins loading a large number of new URLs, and sending or receiving large amounts of data to or from the new URL may be considered more suspicious. Furthermore, in some cases, a whitelist of authorized URLs may be provided within usage pattern storage 408. In the case of a whitelist, any unauthorized URL could be considered suspicious.

On the other hand, if the user application is expected to visit a broad number of URLs of different types, then this type of detection would be more difficult. In that case, other behavioral factors, such as frequency of visiting a particular URL, the volume or type of data sent to the URL, or other factors may be used to detect unusual activity.

Reporting module 420 may be provided to report instances of unusual activity. In some cases, detection logic 416 may assign a weighted score to the detection event to indicate the seriousness of the detection, or the likelihood that the detection is legitimate or problematic. If the score is above a threshold, then reporting module 420 may report the detected event out to an appropriate agent, such as an enterprise security administrator, an enterprise network administrator, an end user, a parent, a law enforcement official, or other responsible entity. In some cases, the reporting may lead to remedial action such as, for example, suspending a user's account, triggering an investigation, triggering parental controls, or manual action directed by the reporting authority.

Figure 5:
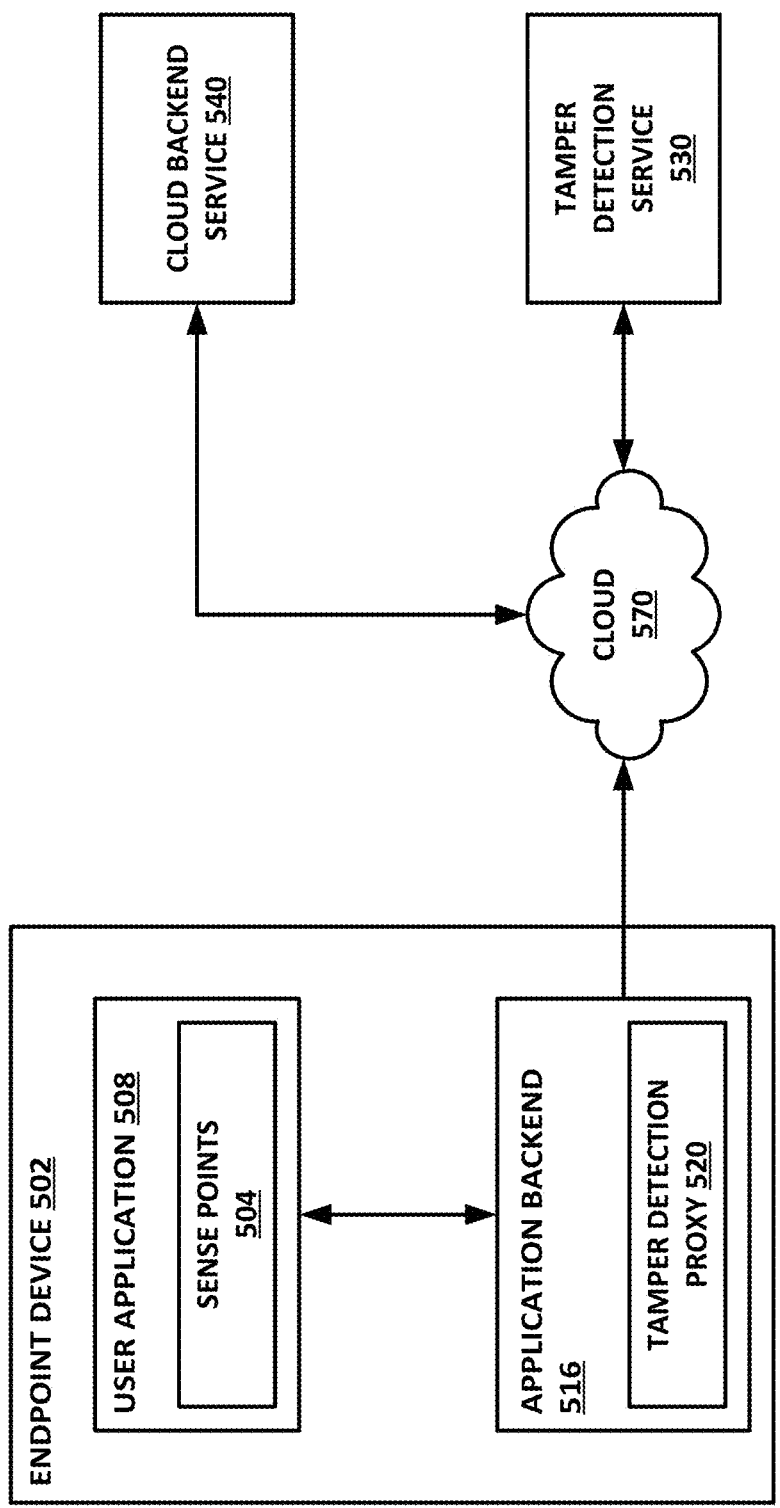
FIG. 5 is a block diagram illustrating interactions between an endpoint device, a tamper detection service, and a cloud backend service.

FIG. 5 is a block diagram illustrating interactions between an endpoint device 502, a tamper detection service 530, and a cloud backend service 540.

In this illustration, endpoint device 502 includes a user application 508. Note that illustrations of such applications are provided in FIGS. 2 and 3.

User application 508 includes sense points 504, which may include probes such as data interceptors, API hooks, virtual machine interfaces, virtual networks, virtual private networks (VPNs), or other mechanisms to intercept data. In some cases, sense points 504 are configured to be lightweight sense points that provide very minimal interference with the operation of user application 508. This helps to ensure that application backend 516 does not unduly interfere with user application 508.

Sense points 504 may include specific calls that are picked up by the tamper detection service, but that have no specific application functionality. These are forwarded, rather, to tamper detection proxy 520, where they can be further forwarded to tamper detection service 530.

In some cases, sense points 504 also provide to application backend 516 execution environment parameters such as the CPU load, memory footprint, battery charge value, battery charging state, free local storage, network stability indicators such as latency, bandwidth, time of day, date, and geographic location, and other execution-type parameters. In some cases, sense points 504 can be easily integrated by providing a lightweight software development kit (SDK) for developer use. In other cases, there need be no modification to user application 508, if the operating system permits application backend 516 to hook certain API calls. In that case, when the API calls are hooked, the appropriate data can be harvested and forwarded via tamper detection proxy 520, and then the calls can be passed to the native API.

Cloud backend service 540 provides remote APIs that are used by user application 508. For example, in the Knight-Quest example illustrated above, cloud backend service 540 provides the remote APIs, including rendering the online world, storing certain data, and providing nonlocal functionality for user application 508.

Tamper detection service 530, which may also be a cloud service (e.g., a detection cloud service) processes a request to detect patterns, then stores patterns and runs logic to detect anomalies and malicious tampering attacks.

Tamper detection service 530 captures requests and stores their basic form, such as request type, order, timing, and metadata such as source internet protocol (IP), execution environment, and similar. These can be used to build a heuristic profile for the application, and/or can be compared to a preapproved behavioral baseline for the application.

Tamper detection service 530 also classifies and detects behavioral patterns, both for normal application requests and for sense points. It also includes logic to analyze and detect whether a tampering attempt is in progress, or has been successfully completed.

Upon detection of an event, depending on the seriousness of the detection (e.g., as determined by a detection score assigned to the detection event), the tamper detection service 530 may notify a customer, administrator, or other reporting authority of the detected tampering. The notification may be provided by way of various transports, such as push notifications, SMS, e-mail, or other suitable notifications. Tamper detection service 530 may also produce reports based on user activity.

In some cases, tamper detection service 530 may also store behavioral patterns of API usage on monitored systems. These stored patterns may then be used as a behavioral baseline, for example in a heuristic model. Stored behavioral data may also be used to classify patterns of usage into different categories, based for example on severity of the behavior. For example, tamper detection service 530 may distinguish between "normal" behavior, "suspicious but permitted" behavior, "possibly malicious" (or otherwise negative) behavior, and "known malicious" behavior.

In some embodiments, a tampering attack need not be successful to be detected by tamper detection service 530. For example, if a user is attempting to debug the application in a debugger, but is unsuccessful in breaking encryption or working around protections, the behavior could still be detected. This user or endpoint could be assigned a reputation for tampering, and unsuccessful tampering attempts could result in a negative marker on the tampering, though possibly less severe than for a successful tampering attempt.

Tamper detection service 530 may also include logic for identifying false positive conditions. For example, unreliable or unstable network connections could result in "suspicious" behavior such as excessive lag, repeated login attempts, or other timing or sequence issues. False positives could be detected in some cases by providing network telemetry along with other telemetry. With good network telemetry, "suspicious" behavior can be correlated to network conditions, and false positives can be avoided. Other false positives could also be affected by other telemetry.

Application backend 516 includes a tamper detection proxy 520. Tamper detection proxy 520 may forward networking traffic requests and other metadata from user application 508 to tamper detection service 530. In some examples, tamper detection proxy 520 provides little, minimal, or no processing or additional functionality. This minimizes the impact on the end user experience with user application 508. Indeed, tamper detection proxy 520 may be optional depending on the environment, or could be a simple pass-through interface. In some cases, telemetry probes may be sent directly to the detection cloud service by the application.

In other cases, a tamper detection proxy 520 may provide more functionality and/or processing. For example, tamper detection proxy 520 could block access from bad or suspicious data sources.

Figure 6:
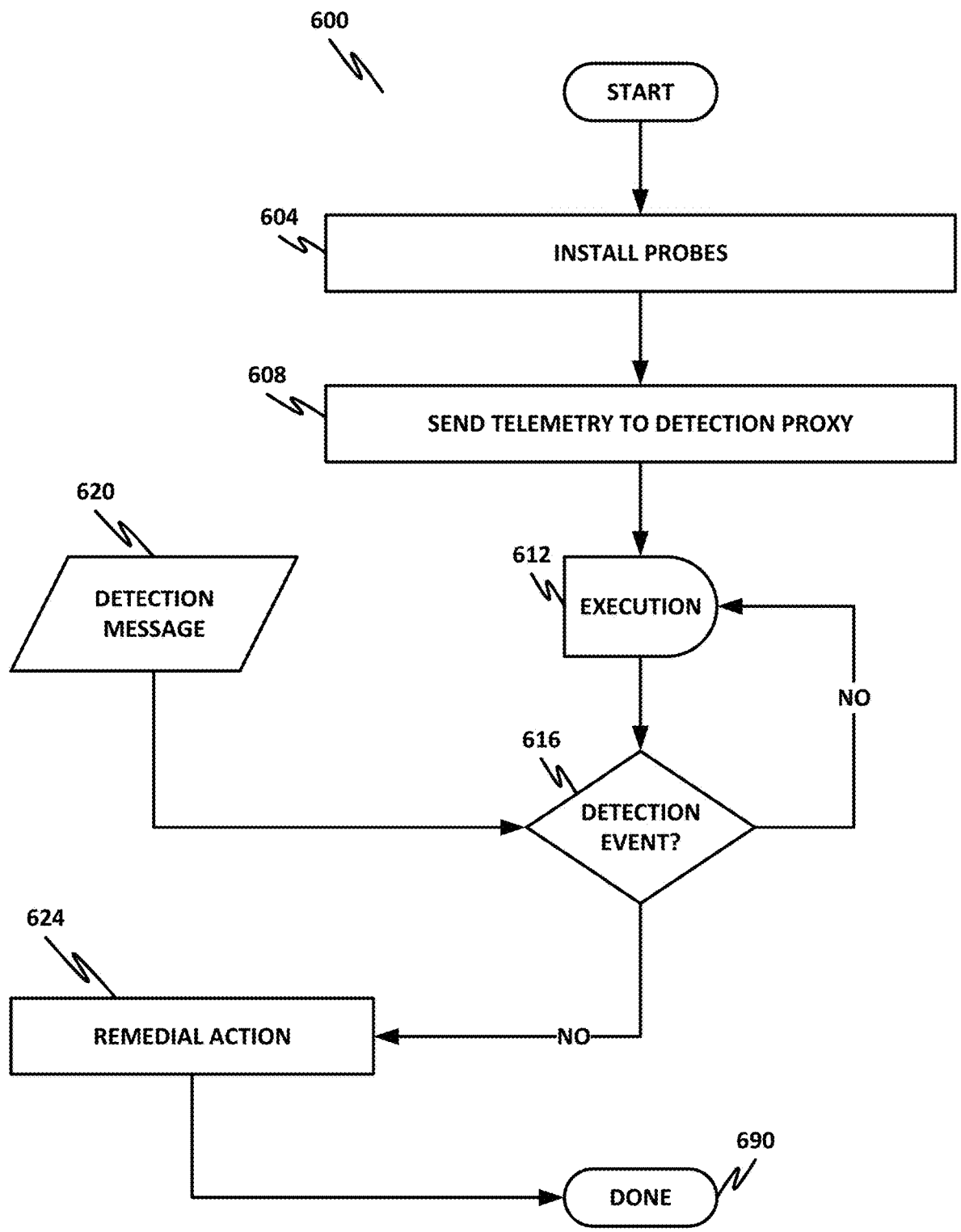
FIG. 6 is a flowchart of a method that may be performed on a local endpoint provided with tamper detection and protection services.

FIG. 6 is a flowchart of a method 600 that may be performed on a local endpoint provided with tamper detection and protection services.

In block 604, the system installs probes as described above. These probes may be used to collect metadata about the application to be monitored.

In block 608, as the application executes, the application backend sends telemetry data to a detection proxy.

In block 612, the application continues executing normally.

As the application is executing normally, it is possible that a detection message 620 may be sent to the endpoint, indicating that a detection event has occurred. In this case, if a detection event has not occurred in block 616, then execution continues normally in block 612.

However, if a detection event does occur in block 616, then in block 624, the system may take remedial action. This remedial action could include, for example, notifying a reporting authority, and then receiving instructions for remedial action to be taken. This could include disabling the application, sandboxing the application, disabling certain portions of the application, resetting certain user data (e.g., if it is determined that a user has cheated on a game and the user's statistics have been modified unfairly, the statistics may be reset to the last known good state, or to some other state), or other remedial action could be taken.

In block 690, the method is done.

Figure 7:
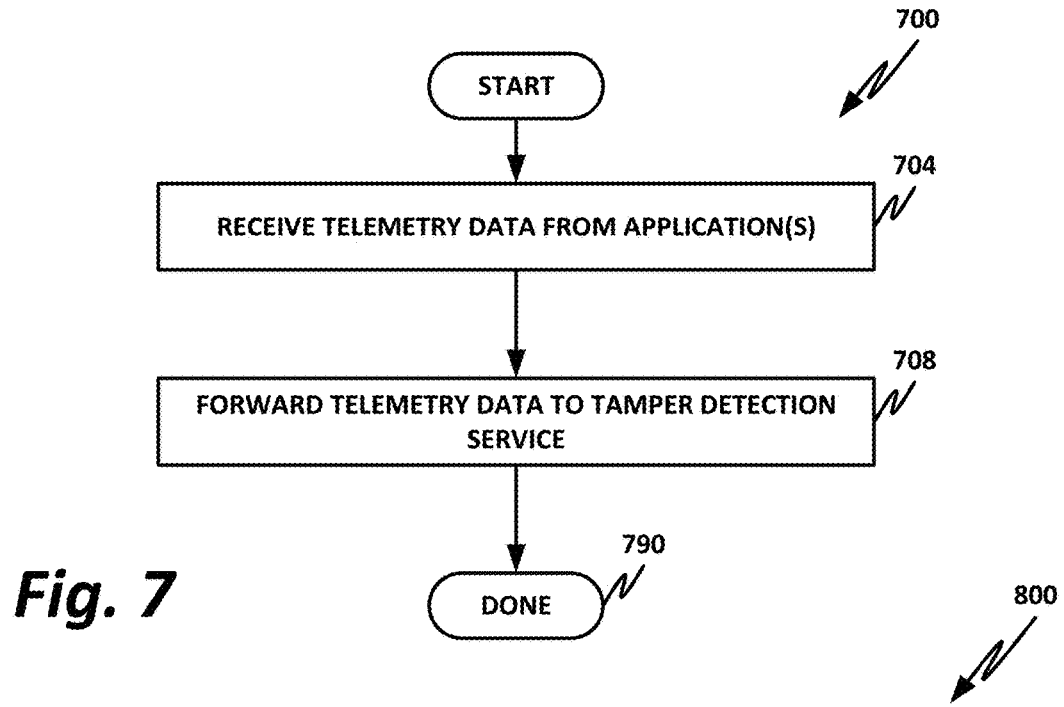
FIG. 7 is a flowchart illustrating a method that may be performed by an application backend.

FIG. 7 is a flowchart illustrating a method that may be performed by an application backend, such as application backend 516 of FIG. 5.

In some cases, the application backend is very lightweight and it is simple to avoid unnecessary interference with the user application. In the example of method 700, in block 704, the application backend receives telemetry data from the application.

In block 708, the application backend forwards the telemetry data to a tamper detection service.

In block 790, the method is done. Method 700 illustrates the lightweight nature of the application backend, and illustrates that in some cases, little or no processing may be performed in order to minimize the impact on the application.

Figure 8:
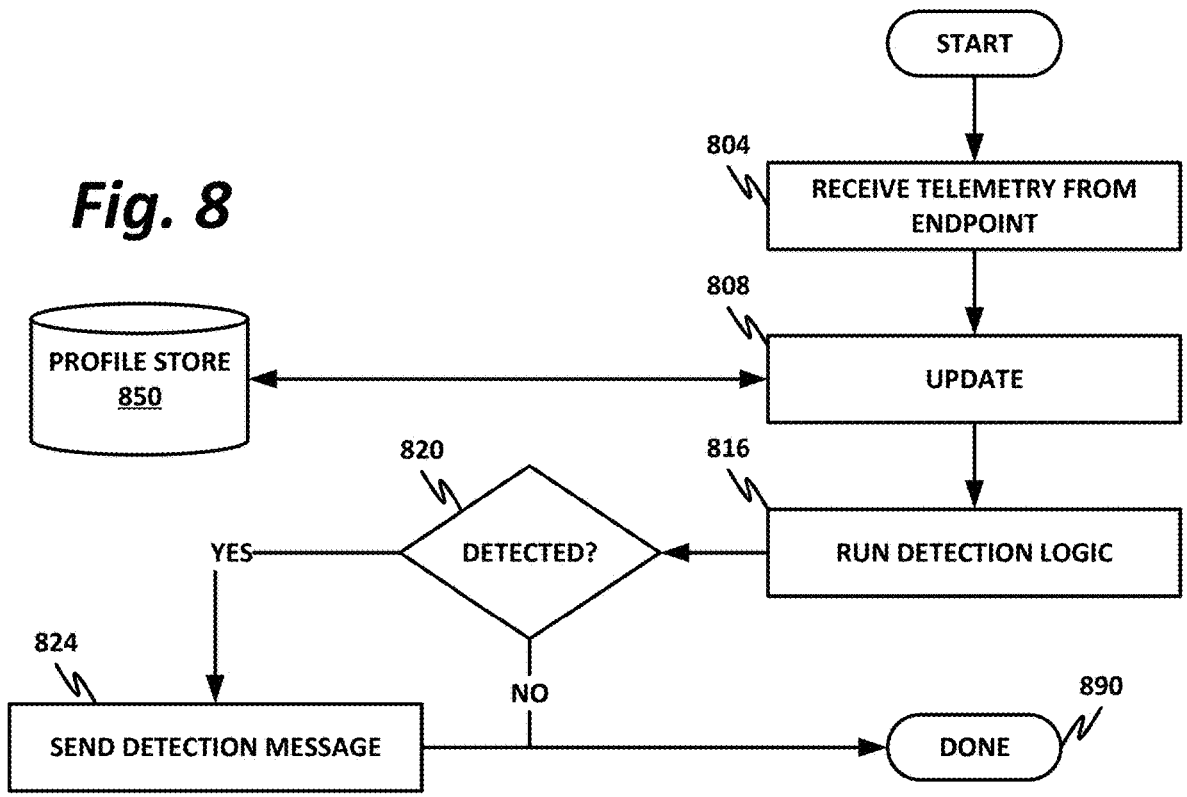
FIG. 8 is a flowchart illustrating a method that may be performed by a tamper detection service.

FIG. 8 is a flowchart illustrating a method that may be performed by a tamper detection service, such as tamper detection service 530 of FIG. 5.

In block 804, the tamper detection service receives telemetry from an endpoint device.

In block 808, the tamper detection service updates profile store 850, which includes the profile for a specific instance of the application, and may also include parameters for out-of-bounds behavior, heuristic models, machine learning models, and pattern matching techniques, as well as other data and techniques that may be used to identify unusual or out-of-bounds behavior.

In block 816, the tamper detection service runs the detection logic. In running the detection logic, if an event is detected, then a score may be provided for the event. The score may be either an individual score for the individual event, or an aggregate score based on a series of events. In the case of an aggregate score, an individual event may not be suspicious or malicious, per se, but a sequence of events may be sufficient to conclude that in the aggregate, a tampering event is likely to have occurred.

In decision block 820, the system determines whether a tamper event has been detected. If no tamper event has been detected, then no further action is needed and in block 890, the method is done.

Returning to decision block 820, if a tamper event is detected, then in block 824 a detection message may be sent to an appropriate reporting authority, and other remedial action may be taken.

The anti-tampering mechanism illustrated in this specification includes certain modules and techniques that focus on detection. By moving detection to the cloud, where attackers cannot reach the detection logic, it becomes difficult or impossible for the attackers to modify or circumvent detection logic.

Embodiments of the system described herein learn "normal" human usage patterns of the protected servicer software, and detect anomalies. This learning may include heuristic models, pattern matching, machine learning models, artificial intelligence (AI), and other models that can be used to detect anomalous behavior.

The addition of "sense points" provides functionality that is similar to tripwires. These sense points in the application may be triggered, for example, when no human interaction is provided where it is expected. Furthermore, these sense points operating as tripwires may be used in conjunction with API hooks, as well as other intercept mechanisms to detect unusual events.

It is observed in connection with this disclosure that when a user is attempting to reverse or tamper with an application, the user often runs the application under a debugger. Running the application under a debugger may be, by itself, considered unusual behavior, as it is uncommon for casual users who are simply using the application to do so. When the application is running under a debugger, performance and timing patterns of the sense points change, along with general usage patterns of the application.

Certain embodiments provide continuous monitoring, coupled with machine learning algorithms, to detect unusual behaviors and malicious deviations from normal usage.

In some embodiments, gaining a long-term history of behavioral patterns contributes to the elimination of false positives.

Figure 9:
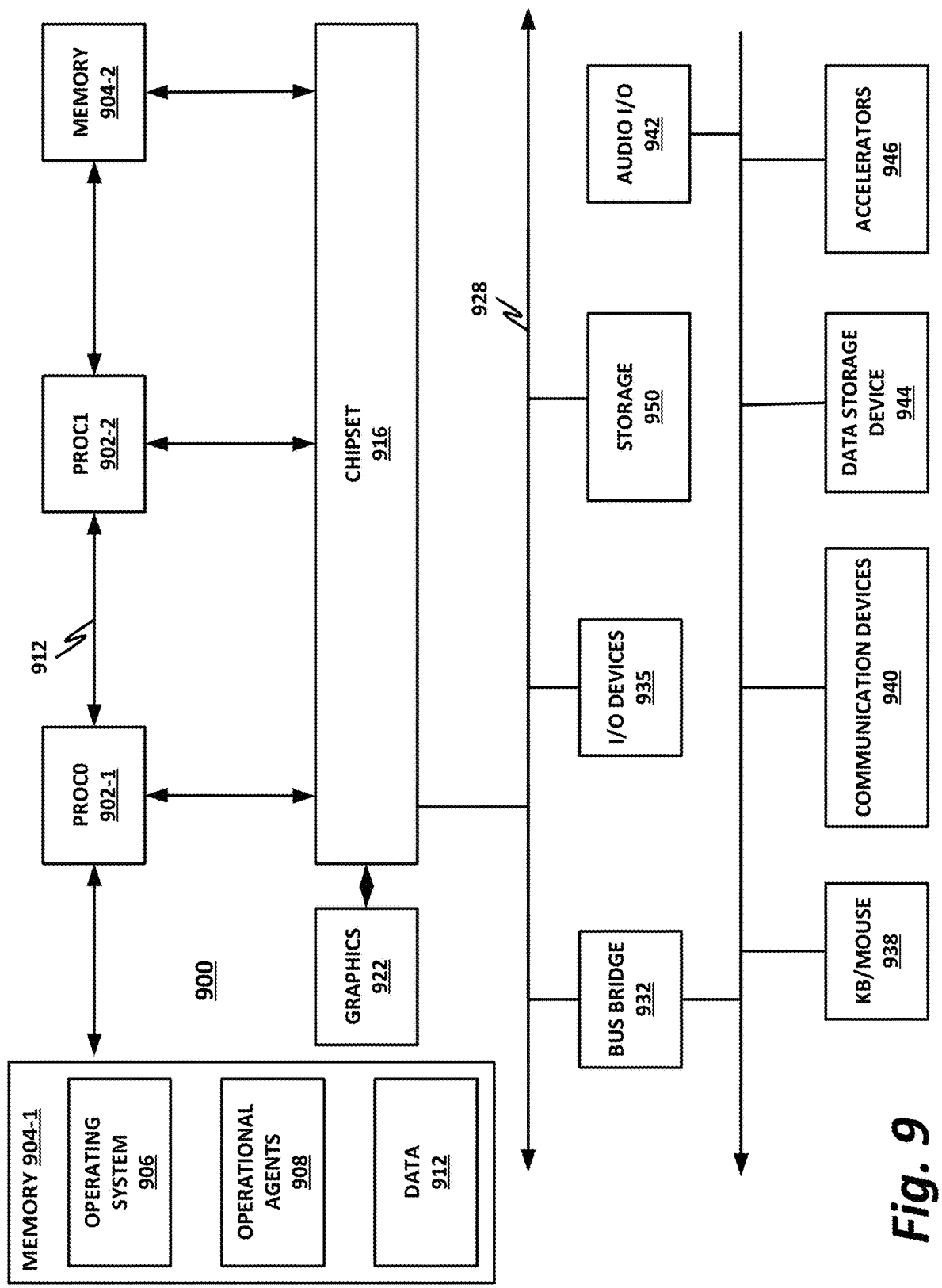
FIG. 9 is a block diagram of selected elements of a hardware platform.

FIG. 9 is a block diagram of a hardware platform 900. In at least some embodiments, hardware platform 900 may be configured or adapted to provide cloud-based tamper detection, according to the teachings of the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 900, even though they may be scattered across a data center, or even located in different data centers.

Hardware platform 900 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, IP telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 900 is arranged in a point-to-point (PtP) configuration. This PtP configuration is popular for personal computer (PC) and server-type devices, although it is not so limited, and any other bus type may be used.

Hardware platform 900 is an example of a platform that may be used to implement embodiments of the teachings of this specification. For example, instructions could be stored in storage 950. Instructions could also be transmitted to the hardware platform in an ethereal form, such as via a network interface, or retrieved from another source via any suitable interconnect. Once received (from any source), the instructions may be loaded into memory 904, and may then be executed by one or more processor 902 to provide elements such as an operating system 906, operational agents 908, or data 912.

Figure 11:
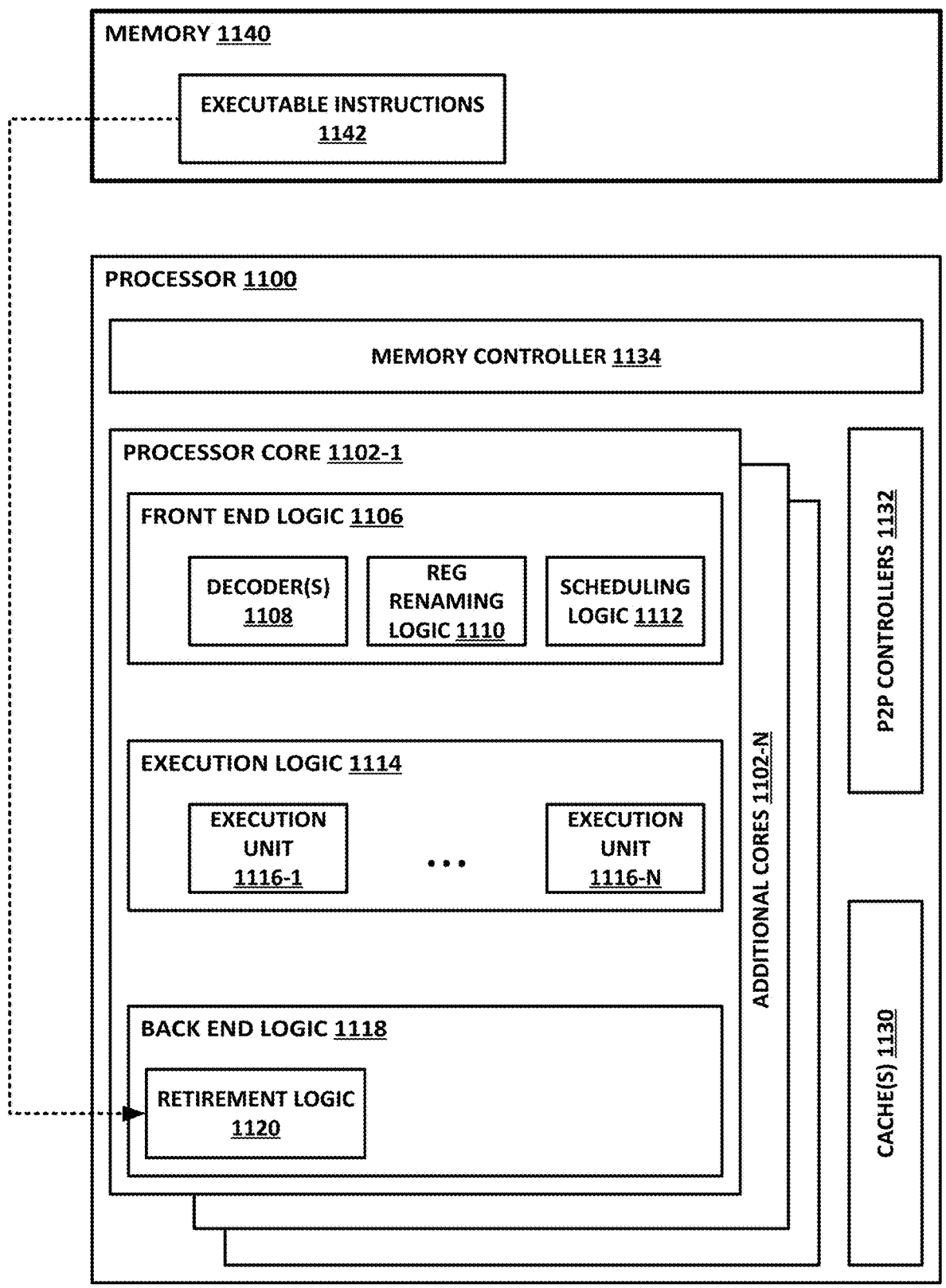
FIG. 11 is a block diagram of selected elements of a processor.

Hardware platform 900 may include several processors 902. For simplicity and clarity, only processors PROC0 902-1 and PROC1 902-2 are shown. Additional processors (such as 2, 4, 8, 16, 24, 32, 64, or 128 processors) may be provided as necessary, while in other embodiments, only one processor may be provided. Details of processors 902 are not illustrated in this FIGURE, but one embodiment is illustrated in FIG. 11. Processors may have any number of cores, such as 1, 2, 4, 8, 16, 24, 32, 64, or 128 cores.

Processors 902 may be any type of processor and may communicatively couple to chipset 916 via, for example, PtP interfaces. Chipset 916 may also exchange data with other elements, such as a high performance graphics adapter 922. In alternative embodiments, any or all of the PtP links illustrated in FIG. 9 could be implemented as any type of bus, or other configuration rather than a PtP link. In various embodiments, chipset 916 may reside on the same die or package as a processor 902 or on one or more different dies or packages. Each chipset may support any suitable number of processors 902. A chipset 916 (which may be a chipset, uncore, Northbridge, Southbridge, or other suitable logic and circuitry) may also include one or more controllers to couple other components to one or more CPUs.

Two memories, 904-1 and 904-2 are shown, connected to PROC0 902-1 and PROC1 902-2, respectively. As an example, each processor is shown connected to its memory in a direct memory access (DMA) configuration, though other memory architectures are possible, including ones in which memory 904 communicates with a processor via a bus. For example, some memories may be connected via a system bus, or in a data center, memory may be accessible in a remote DMA (RDMA) configuration.

Memory 904 may include any form of volatile or nonvolatile memory including, without limitation, magnetic media (e.g., one or more tape drives), optical media, flash, RAM, double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 904 may be used for short, medium, and/or long-term storage. Memory 904 may store any suitable data or information utilized by platform logic. In some embodiments, memory 904 may also comprise storage for instructions that may be executed by the cores of processors 902 or other processing elements (e.g., logic resident on chipsets 916) to provide functionality.

In certain embodiments, memory 904 may comprise a relatively low-latency volatile main memory, while storage 950 may comprise a relatively higher-latency nonvolatile memory. However, memory 904 and storage 950 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 904 and storage 950, for example, in a single physical memory device, and in other cases, memory 904 and/or storage 950 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 922 may be configured to provide a human-readable visual output, such as a command-line interface (CLI) or graphical desktop such as Microsoft Windows, Apple OSX desktop, or a Unix/Linux X Window System-based desktop. Graphics adapter 922 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 922 may include a hardware graphics card, which may have its own memory and its own graphics processing unit (GPU).

Chipset 916 may be in communication with a bus 928 via an interface circuit. Bus 928 may have one or more devices that communicate over it, such as a bus bridge 932, I/O devices 935, accelerators 946, communication devices 940, and a keyboard and/or mouse 938, by way of nonlimiting example. In general terms, the elements of hardware platform 900 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 940 can broadly include any communication not covered by a network interface and the various I/O devices described herein. This may include, for example, various universal serial bus (USB), FireWire, Lightning, or other serial or parallel devices that provide communications.

I/O Devices 935 may be configured to interface with any auxiliary device that connects to hardware platform 900 but that is not necessarily a part of the core architecture of hardware platform 900. A peripheral may be operable to provide extended functionality to hardware platform 900, and may or may not be wholly dependent on hardware platform 900. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 942 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 932 may be in communication with other devices such as a keyboard/mouse 938 (or other input devices such as a touch screen, trackball, etc.), communication devices 940 (such as modems, network interface devices, peripheral interfaces such as PCI or PCIe, or other types of communication devices that may communicate through a network), audio I/O 942, a data storage device 944, and/or accelerators 946. In alternative embodiments, any portions of the bus architectures could be implemented with one or more PtP links.

Operating system 906 may be, for example, Microsoft Windows, Linux, UNIX, Mac OS X, iOS, MS-DOS, or an embedded or real-time operating system (including embedded or real-time flavors of the foregoing). In some embodiments, a hardware platform 900 may function as a host platform for one or more guest systems that invoke application (e.g., operational agents 908).

Operational agents 908 may include one or more computing engines that may include one or more non-transitory computer-readable mediums having stored thereon executable instructions operable to instruct a processor to provide operational functions. At an appropriate time, such as upon booting hardware platform 900 or upon a command from operating system 906 or a user or security administrator, processor 902 may retrieve a copy of the operational agent (or software portions thereof) from storage 950 and load it into memory 904. Processor 910 may then iteratively execute the instructions of operational agents 908 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 900 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), VPN, intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 900 may be virtualized, in particular the processor(s) and memory. For example, a virtualized environment may run on OS 906, or OS 906 could be replaced with a hypervisor or virtual machine manager. In this configuration, a virtual machine running on hardware platform 900 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 9 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 10. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 10:
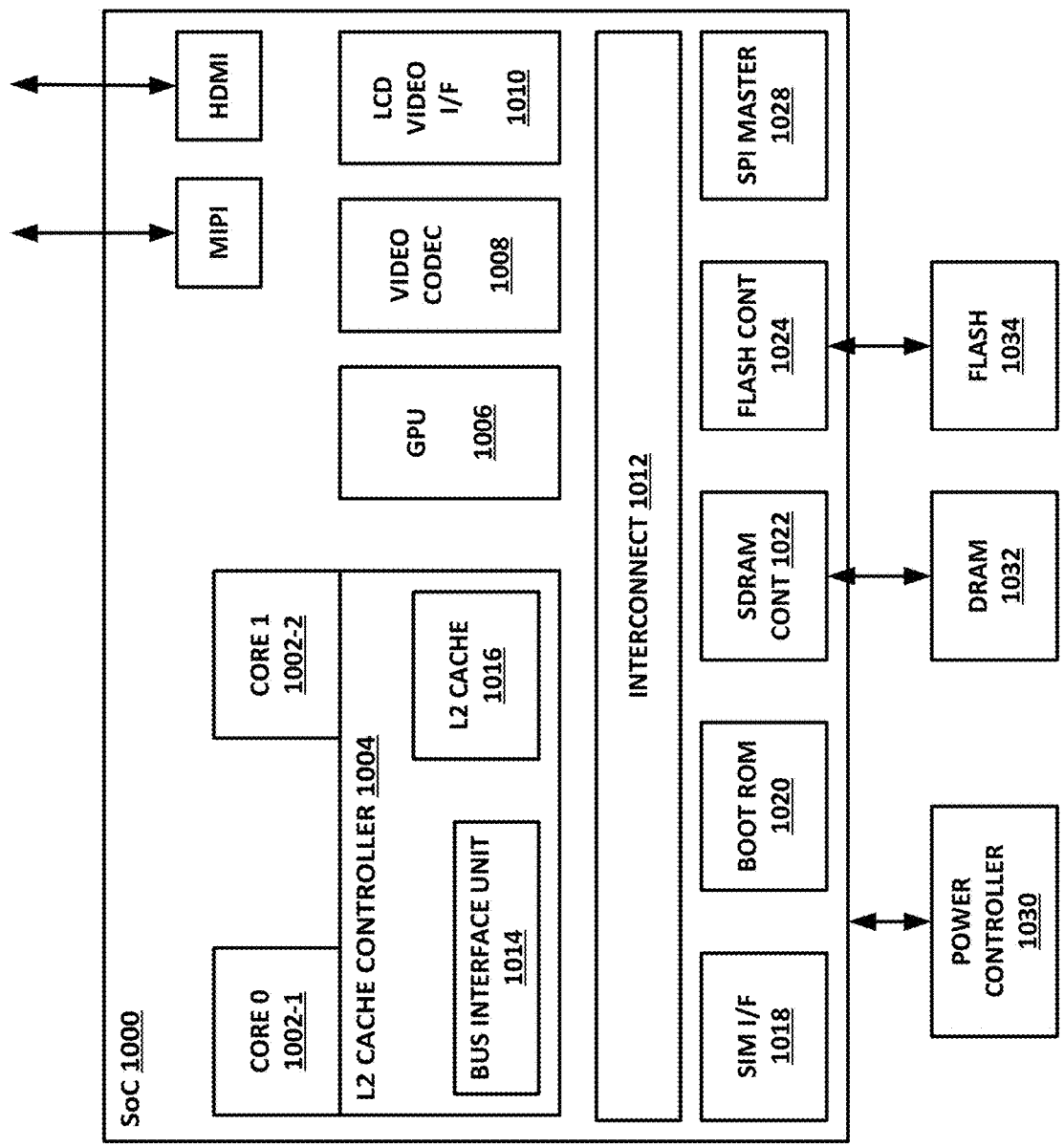
FIG. 10 is a block diagram of selected elements of a system-on-a-chip (SoC).

FIG. 10 is a block illustrating selected elements of an example SoC 1000. In at least some embodiments, SoC 1000 may be configured or adapted to provide cloud-based tamper detection, according to the teachings of the present specification.

At least some of the teachings of the present specification may be embodied on an SoC 1000, or may be paired with an SoC 1000. SoC 1000 may include, or may be paired with, an advanced reduced instruction set computer machine (ARM) component. For example, SoC 1000 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 1000 could also be integrated into, for example, a PC, server, video processing components, laptop computer, notebook computer, netbook, or touch-enabled device.

As with hardware platform 900 above, SoC 1000 may include multiple cores 1002-1 and 1002-2. In this illustrative example, SoC 1000 also includes an L2 cache control 1004, a GPU 1006, a video codec 1008, a liquid crystal display (LCD) I/F 1010 and an interconnect 1012. L2 cache control 1004 can include a bus interface unit 1014, a L2 cache 1016. Liquid crystal display (LCD) I/F 1010 may be associated with mobile industry processor interface (MIPI)/HDMI links that couple to an LCD.

SoC 1000 may also include a subscriber identity module (SIM) I/F 1018, a boot ROM 1020, a synchronous dynamic random access memory (SDRAM) controller 1022, a flash controller 1024, a serial peripheral interface (SPI) master 1028, a suitable power control 1030, a dynamic RAM (DRAM) 1032, and flash 1034. In addition, one or more embodiments include one or more communication capabilities, interfaces, and features such as instances of Bluetooth 1036, a 3G modem 1038, a global positioning system (GPS) 1040, and an 802.11 Wi-Fi 1042.

Designers of integrated circuits such as SoC 1000 (or other integrated circuits) may use intellectual property blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 11 is a block diagram illustrating selected elements of a processor 1100. In at least some embodiments, processor 1100 may be configured or adapted to provide cloud-based tamper detection, according to the teachings of the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 1100 may include any number of processing elements, which may be symmetrical or asymmetrical.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an IC, which potentially includes any number of other processing elements, such as cores or hardware threads.

A core may refer to logic located on an IC capable of maintaining an independent architectural state, wherein each independently maintained architectural state is associated with at least some dedicated execution resources. A hardware thread may refer to any logic located on an IC capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 1100 includes one or more processor cores 1102, including core 1102-1-1102-N. Cores 1102 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 1100 may include at least one shared cache 1130, which may be treated logically as part of memory 1140. Memory 1140 may include executable instructions 1142, as illustrated. Caches 1130 may be filled according to known caching techniques, and may store instructions and/or data that may be used by one or more components of processor 1100.

Processor 1100 may include an integrated memory controller (MC) 1134, to communicate with memory 1140. Memory controller 1134 may include logic and circuitry to interface with memory 1140, and may also include a cache controller to handle cache filling and evicting instructions and data to and from cache 1130.

By way of example, each core 1102 may include front-end logic 1106, execution logic 1114, and backend logic 1118.

In the illustrated embodiment, front-end logic 1106 includes an instruction decoder or decoders 1108, register renaming logic 1110, and scheduling logic 1112. Decoder 1108 may decode instructions received. Register renaming logic 1110 may provide register renaming, for example to facilitate pipelining. Scheduling logic 1112 may schedule instruction execution, and may provide out-of-order (OOO) execution. Front-end logic 1106 may fetch incoming instructions, perform various processing (e.g., caching, decoding, branch predicting, etc.), and pass instructions to execution logic 1114.

Execution logic 1114 includes one or more execution units 1116-1-1116-N. Execution units 1116 may include hardware instructions and microcode to carry out the provided instructions.

Backend logic 1118 includes retirement logic 1120. Core 1102 may provide for speculative execution of instructions, branch prediction, and similar. Retirement logic 1120 may be configured to determine which predicted instructions were actually needed by the program flow.

Processor 1100 may also include a PtP controller 1132, which enables connection to an uncore, chipset, Northbridge, Southbridge, or bus, by way of example.

Figure 12:
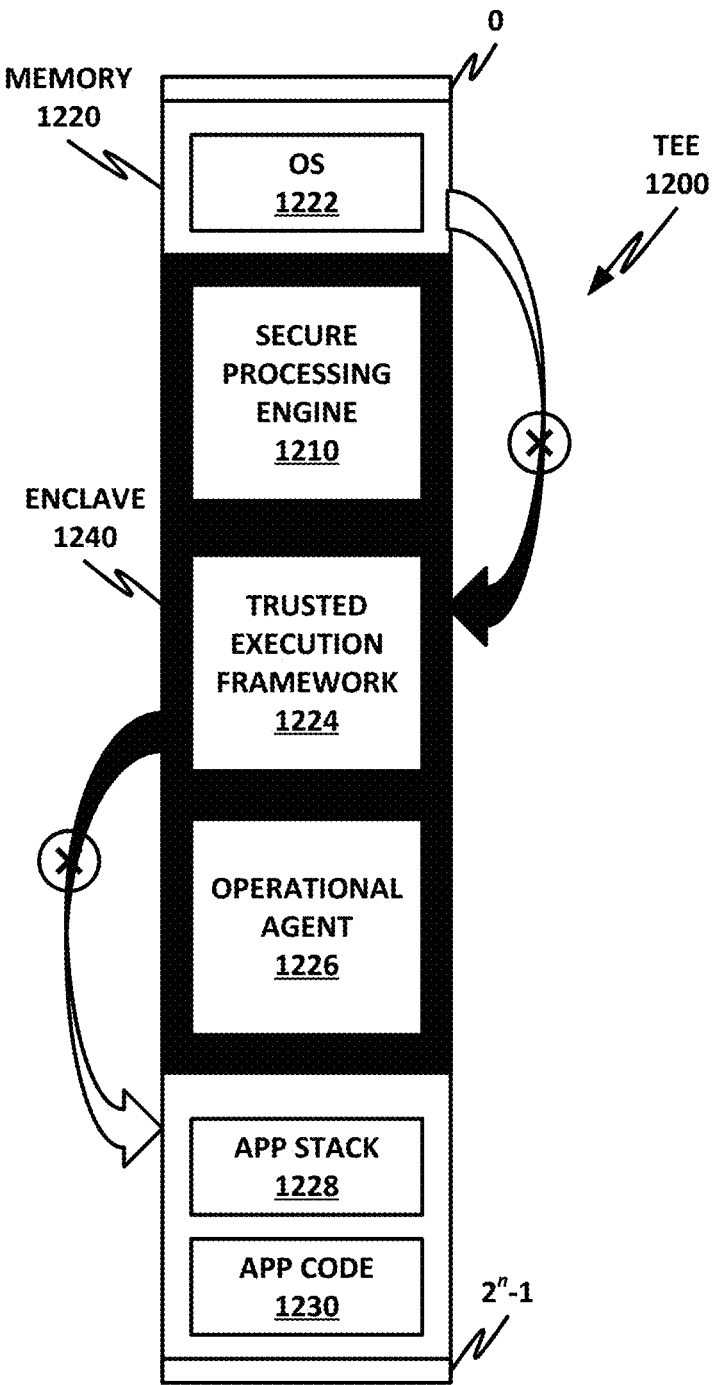
FIG. 12 is a block diagram of selected elements of a trusted execution environment (TEE).

FIG. 12 is a block diagram of a trusted execution environment (TEE) 1200. In at least some embodiments, cloud-based tamper detection according to the teachings of the present specification may be provided within TEE 1200.

In the example of FIG. 12, memory 1220 is addressable by n-bits, ranging in address from 0 to $2^n-1$ (note, however, that in many cases, the size of the address space may far exceed the actual memory available). Within memory 1220 is an OS 1222, enclave 1240, application stack 1228, and application code 1230.

In this example, enclave 1240 is a specially-designated portion of memory 1220 that cannot be entered into or exited from except via special instructions, such as Intel Software Guard Extensions (SGX) or similar. Enclave 1240 is provided as an example of a secure environment which, in conjunction with a secure processing engine 1210, forms a TEE 1200 on a hardware platform such as platform 900 of FIG. 9. A TEE 1200 is a combination of hardware, software, and/or memory allocation that provides the ability to securely execute instructions without interference from outside processes, in a verifiable way. By way of example, TEE 1200 may include memory enclave 1240 or some other protected memory area, and a secure processing engine 1210, which includes hardware, software, and instructions for accessing and operating on enclave 1240. Nonlimiting examples of solutions that either are or that can provide a TEE include Intel SGX, ARM TrustZone, AMD Platform Security Processor, Kinibi, securiTEE, OP-TEE, TLK, T6, Open TEE, SierraTEE, CSE, VT-x, MemCore, Canary Island, Docker, and Smack. Thus, it should be noted that in an example, secure processing engine 1210 may be a user-mode application that operates via trusted execution framework 1224 within enclave 1240. TEE 1200 may also conceptually include processor instructions that secure processing engine 1210 and trusted execution framework 1224 require to operate within enclave 1240.

Secure processing engine 1210 and trusted execution framework 1224 may together form a trusted computing base (TCB), which is a set of programs or computational units that are trusted to be secure. Conceptually, it may be advantageous to keep TCB relatively small so that there are fewer attack vectors for malware objects or for negligent software. Thus, for example, operating system 1222 may be excluded from TCB, in addition to the regular application stack 1228 and application code 1230.

In certain systems, computing devices equipped with Intel SGX or equivalent instructions may be capable of providing an enclave 1240. It should be noted, however, that many other examples of TEEs are available, and TEE 1200 is provided only as one example thereof. Other secure environments may include, by way of nonlimiting example, a virtual machine, sandbox, testbed, test machine, or other similar device or method for providing a TEE 1200.

In an example, enclave 1240 provides a protected memory area that cannot be accessed or manipulated by ordinary computer instructions. Enclave 1240 is described with particular reference to an Intel SGX enclave by way of example, but it is intended that enclave 1240 encompass any secure processing area with suitable properties, regardless of whether it is called an "enclave."

One feature of an enclave is that once an enclave region 1240 of memory 1220 is defined, as illustrated, a program pointer cannot enter or exit enclave 1240 without the use of special enclave instructions or directives, such as those provided by Intel SGX architecture. For example, SGX processors provide the ENCLU[EENTER], ENCLU[ERESUME], and ENCLU[EEXIT]. These are the only instructions that may legitimately enter into or exit from enclave 1240.

Thus, once enclave 1240 is defined in memory 904, a program executing within enclave 1240 may be safely verified to not operate outside of its bounds. This security feature means that secure processing engine 1210 is verifiably local to enclave 1240. Thus, when an untrusted packet provides its content to be rendered with trusted execution framework 1224 of enclave 1240, the result of the rendering is verified as secure.

Enclave 1240 may also digitally sign its output, which provides a verifiable means of ensuring that content has not been tampered with or modified since being rendered by secure processing engine 1210. A digital signature provided by enclave 1240 is unique to enclave 1240 and is unique to the hardware of the device hosting enclave 1240.

Figure 13:
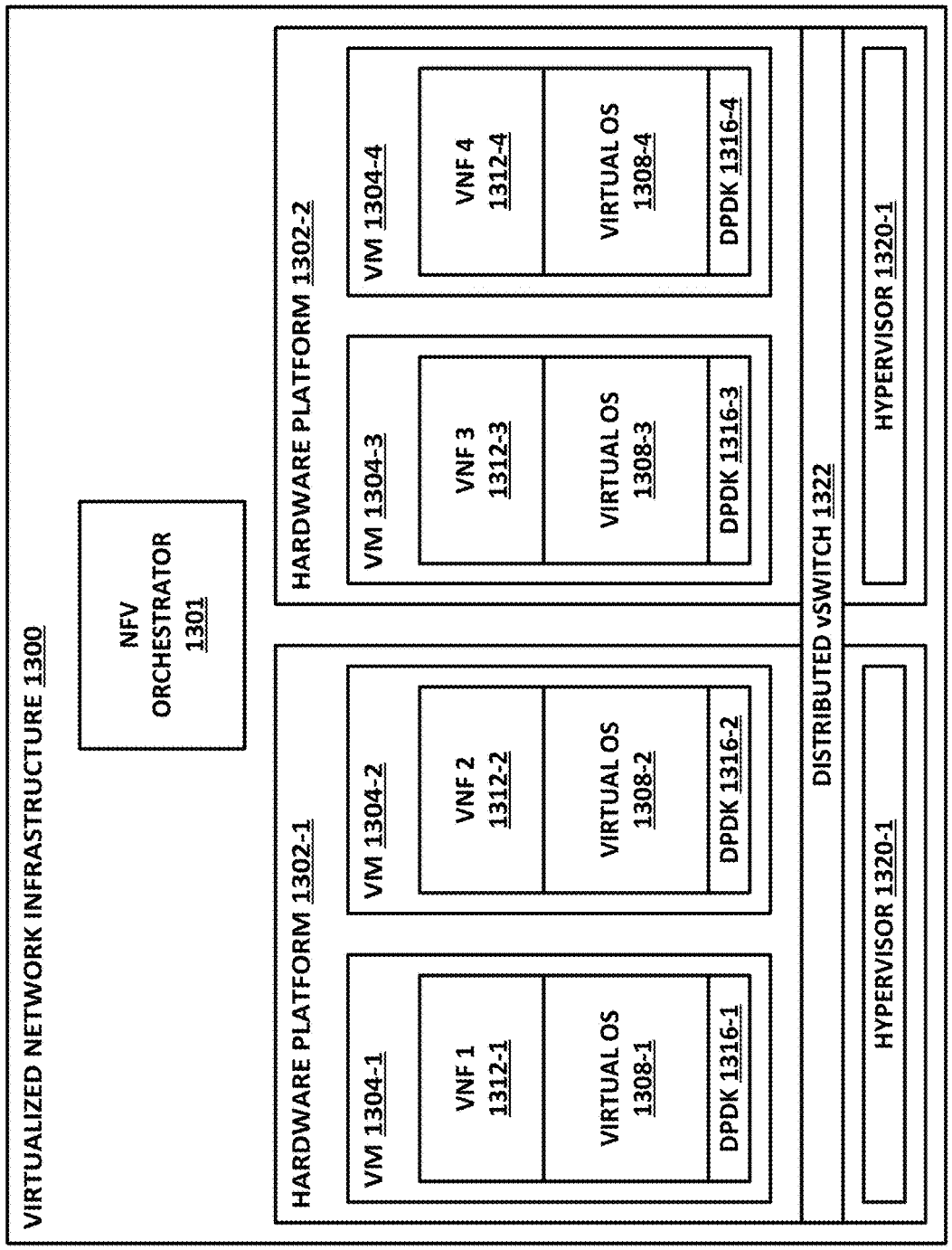
FIG. 13 is a block diagram of selected elements of a network function virtualization (NFV) infrastructure.

FIG. 13 is a block diagram of a network function virtualization (NFV) infrastructure 1300. In at least some embodiments, cloud-based tamper detection according to the teachings of the present specification may be provided within NFV infrastructure 1300.

NFV is an aspect of network virtualization that is generally considered distinct from, but that can still interoperate with, software defined networking (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1300. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 13, an NFV orchestrator 1301 manages a number of the VNFs 1312 running on an NFVI 1300. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1301 a valuable system resource. Note that NFV orchestrator 1301 may provide a browser-based or graphical configuration interface, and in some embodiments may be integrated with SDN orchestration functions.

Note that NFV orchestrator 1301 itself may be virtualized (rather than a special-purpose hardware appliance). NFV orchestrator 1301 may be integrated within an existing SDN system, wherein an operations support system (OSS) manages the SDN. This may interact with cloud resource management systems (e.g., OpenStack) to provide NFV orchestration. An NFVI 1300 may include the hardware, software, and other infrastructure to enable VNFs to run. This may include a hardware platform 1302 on which one or more VMs 1304 may run. For example, hardware platform 1302-1 in this example runs VMs 1304-1 and 1304-2. Hardware platform 1302-2 runs VMs 1304-3 and 1304-4. Each hardware platform may include a hypervisor 1320, virtual machine manager (VMM), or similar function, which may include and run on a native (bare metal) operating system, which may be minimal so as to consume very few resources.

Hardware platforms 1302 may be or comprise a rack or several racks of blade or slot servers (including, e.g., processors, memory, and storage), one or more data centers, other hardware resources distributed across one or more geographic locations, hardware switches, or network interfaces. An NFVI 1300 may also include the software architecture that enables hypervisors to run and be managed by NFV orchestrator 1301.

Running on NFVI 1300 are a number of VMs 1304, each of which in this example is a VNF providing a virtual service appliance. Each VM 1304 in this example includes an instance of the Data Plane Development Kit (DPDK), a virtual operating system 1308, and an application providing the VNF 1312.

Virtualized network functions could include, as nonlimiting and illustrative examples, firewalls, intrusion detection systems, load balancers, routers, session border controllers, DPI services, network address translation (NAT) modules, or call security association.

The illustration of FIG. 13 shows that a number of VNFs 1304 have been provisioned and exist within NFVI 1300. This FIGURE does not necessarily illustrate any relationship between the VNFs and the larger network, or the packet flows that NFVI 1300 may employ.

The illustrated DPDK instances 1316 provide a set of highly-optimized libraries for communicating across a virtual switch (vSwitch) 1322. Like VMs 1304, vSwitch 1322 is provisioned and allocated by a hypervisor 1320. The hypervisor uses a network interface to connect the hardware platform to the data center fabric (e.g., an HFI). This HFI may be shared by all VMs 1304 running on a hardware platform 1302. Thus, a vSwitch may be allocated to switch traffic between VMs 1304. The vSwitch may be a pure software vSwitch (e.g., a shared memory vSwitch), which may be optimized so that data are not moved between memory locations, but rather, the data may stay in one place, and pointers may be passed between VMs 1304 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1322 is illustrated, wherein vSwitch 1322 is shared between two or more physical hardware platforms 1302.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may results in substitute arrangements, design choices, device possibilities, hardware configurations, software implementations, and equipment options.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

Example Implementations

There is disclosed in one example, a computing apparatus, comprising: a hardware platform comprising a processor and a memory; a user application; telemetry probes to collect telemetry about use of the user space application; a detection proxy to collect telemetry data from the telemetry probes and forward the telemetry data to a detection cloud service; and logic to receive from the detection cloud service a detection message that the user application has exhibited behavior consistent with tampering, and to take remedial action responsive to the detection message.

There is further disclosed an example computing apparatus, wherein the user application includes an internal anti-tampering mechanism.

There is further disclosed an example computing apparatus, wherein the detection proxy comprises a unidirectional forwarder function for telemetry data.

There is further disclosed an example computing apparatus, wherein the detection proxy performs little or no processing on the telemetry data before forwarding.

There is further disclosed an example computing apparatus, wherein the telemetry data comprise network traffic request data.

There is further disclosed an example computing apparatus, wherein the traffic requests comprise request type, request order, and request timing.

There is further disclosed an example computing apparatus, wherein the traffic request data comprise source internet protocol (IP) address or destination IP address.

There is further disclosed an example computing apparatus, wherein the telemetry data include execution environment data.

There is further disclosed an example computing apparatus, wherein the execution environment data include CPU load, memory footprint, battery charge value, or battery charging state.

There is further disclosed an example computing apparatus, wherein the detection proxy is to provide passive monitoring of the user application.

There is further disclosed an example computing apparatus, wherein the detection proxy is to provide continuous monitoring of the user application.

There is further disclosed an example computing apparatus, further comprising an anti-malware engine, wherein the detection proxy cooperates with the anti-malware engine to detect malicious modification of the user application.

There is further disclosed an example computing apparatus, wherein the user application is a game.

There is further disclosed an example computing apparatus, wherein the user application includes at least one paid feature, and wherein the detection message indicates that the application reached the paid feature without appropriate remuneration.

There is further disclosed an example computing apparatus, wherein the detection proxy includes logic to detect the use of a debugger.

There is further disclosed an example computing apparatus, wherein the telemetry probes comprise application programming interface (API) hooks.

There is also disclosed an example of one or more tangible, non-transitory computer-readable storage media having stored thereon executable instructions to instruct a processor to: install telemetry probes for a local application's access to a remote application programming interface (API); install an application backend for the local application, the application backend comprising a detection engine, the detection engine comprising instructions to record and forward telemetry about the remote API calls to a detection cloud service; receive from the detection cloud service a tampering notification; and act on the tampering notification.

There is further disclosed an example of one or more tangible, non-transitory computer-readable media, wherein the local application includes local anti-tampering means.

There is further disclosed an example of one or more tangible, non-transitory computer-readable media, wherein the detection proxy comprises a unidirectional forwarder function for the telemetry.

There is further disclosed an example of one or more tangible, non-transitory computer-readable media, wherein the detection proxy performs minimum necessary processing to forward the telemetry to the detection cloud service.

There is further disclosed an example of one or more tangible, non-transitory computer-readable media, wherein the telemetry comprises network traffic request data.

There is further disclosed an example of one or more tangible, non-transitory computer-readable media, wherein the traffic request data comprise request type, request order, and request timing.

There is further disclosed an example of one or more tangible, non-transitory computer-readable media, wherein the traffic request data comprise source IP address or destination IP address.

There is further disclosed an example of one or more tangible, non-transitory computer-readable media, wherein the telemetry includes execution environment data.

There is further disclosed an example of one or more tangible, non-transitory computer-readable media, wherein the execution environment data include CPU load, memory footprint, battery charge value, or battery charging state.

There is further disclosed an example of one or more tangible, non-transitory computer-readable media, wherein the detection proxy is to provide passive monitoring of the local application.

There is further disclosed an example of one or more tangible, non-transitory computer-readable media, wherein the detection proxy is to provide continuous monitoring of the local application.

There is further disclosed an example of one or more tangible, non-transitory computer-readable media, wherein the instructions are further to interface with a local anti-malware engine, wherein the detection proxy cooperates with the anti-malware engine to detect malicious modification of the local application.

There is further disclosed an example of one or more tangible, non-transitory computer-readable media, wherein the local application is a game.

There is further disclosed an example of one or more tangible, non-transitory computer-readable media, wherein the local application includes at least one paid feature, and wherein the tampering notification indicates that the application reached the paid feature without appropriate remuneration.

There is further disclosed an example of one or more tangible, non-transitory computer-readable media, wherein the detection proxy includes logic to detect the use of a debugger.

There is further disclosed an example of one or more tangible, non-transitory computer-readable media, wherein the telemetry probes comprise application programming interface (API) hooks.

There is also disclosed an example computer-implemented method of detecting tampering with a local application, comprising: hooking calls by the local application to application programming interface (API) functions, including at least one API function; collecting telemetry data from the hooked calls; forwarding the telemetry data to a remote tampering detection service; and receiving from the remote tampering detection service a detection message that the local application has exhibited behavior consistent with tampering, and to take remedial action responsive to the detection message.

There is further disclosed an example method, wherein forwarding the telemetry data comprises provisioning a unidirectional data route to the remote tampering detection service.

There is further disclosed an example method, further comprising performing only minimally-necessary processing on the telemetry before forwarding the telemetry to the remote tampering detection service.

There is further disclosed an example method, wherein the telemetry comprises network traffic request data.

There is further disclosed an example method, wherein the traffic request data comprise request type, request order, and request timing.

There is further disclosed an example method, wherein the traffic request data comprise source IP address or destination IP address.

There is further disclosed an example method, wherein the telemetry includes execution environment data.

There is further disclosed an example method, wherein the execution environment data include CPU load, memory footprint, battery charge value, or battery charging state.

There is further disclosed an example method, further comprising providing passive monitoring of the local application.

There is further disclosed an example method, further comprising providing continuous monitoring of the local application.

There is further disclosed an example method, further comprising interfacing with a local anti-malware engine, wherein the detection proxy cooperates with the anti-malware engine to detect malicious modification of the local application.

There is further disclosed an example method, wherein the local application is a game.

There is further disclosed an example method, wherein the local application includes at least one paid feature, and wherein the tampering notification indicates that the application reached the paid feature without appropriate remuneration.

There is further disclosed an example method, wherein the detection proxy includes logic to detect the use of a debugger.

There is further disclosed an example method, wherein collecting telemetry data comprises identifying use of a debugger.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions that, when executed, cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize an apparatus as illustrated in a number of the above examples.

There is also disclosed an example server apparatus, comprising: a hardware platform comprising a processor and a memory; a network interface; and instructions encoded within the memory to instruct the processor to: receive from a detection proxy of an endpoint telemetry data related to a user application of the endpoint's use of one or more remote application programming interfaces (APIs); analyze the telemetry data; determine from the analysis that the user application exhibits behavior out of bounds of expected behavior for the user application; and send a notification of the out-of-bounds behavior.

There is further disclosed an example server apparatus, wherein sending the notification comprises sending the notification to a third-party cloud service that provides the one or more remote APIs.

There is further disclosed an example server apparatus, wherein sending the notification comprises notifying a security agent on the endpoint.

There is further disclosed an example server apparatus, wherein the out-of-bounds behavior includes the use of a debugger.

There is further disclosed an example server apparatus, wherein the out-of-bounds behavior includes out-of-bounds timing between API calls.

There is further disclosed an example server apparatus, wherein the out-of-bounds behavior includes out-of-sequence access to remote APIs or resources.

There is further disclosed an example server apparatus, wherein the out-of-bounds behavior includes omission of expected operations in a sequence.

There is further disclosed an example server apparatus, wherein the out-of-bounds behavior includes insertion of unexpected operations in a sequence.

There is further disclosed an example server apparatus, wherein the out-of-bounds behavior includes a sudden or unexpected change in CPU usage.

There is further disclosed an example server apparatus, wherein the out-of-bounds behavior includes a sudden or unexpected change in memory usage.

There is further disclosed an example server apparatus, wherein the out-of-bounds behavior includes access to an unexpected uniform resource locator (URL) by the user application.

There is also disclosed an example of one or more tangible, non-transitory computer-readable storage media having stored thereon executable instructions to instruct a processor to: communicatively couple to an endpoint device via a cloud interface; communicatively couple to an application backend of the endpoint device; receive from the application backend telemetry data related to a user application of the endpoint's use of one or more remote application programming interfaces (APIs) provided by a third-party independent software vendor (ISV); analyze the telemetry data; determine from the analysis that the user application exhibits behavior out of bounds of expected behavior for the user application; and send a notification of the out-of-bounds behavior to the third-party ISV.

There is further disclosed an example of one or more tangible, non-transitory computer-readable storage media, wherein sending the notification comprises notifying a security agent on the endpoint.

There is further disclosed an example of one or more tangible, non-transitory computer-readable storage media, wherein the out-of-bounds behavior includes the use of a debugger.

There is further disclosed an example of one or more tangible, non-transitory computer-readable storage media, wherein the out-of-bounds behavior includes out-of-bounds timing between API calls.

There is further disclosed an example of one or more tangible, non-transitory computer-readable storage media, wherein the out-of-bounds behavior includes out-of-sequence access to remote APIs or resources.

There is further disclosed an example of one or more tangible, non-transitory computer-readable storage media, wherein the out-of-bounds behavior includes omission of expected operations in a sequence.

There is further disclosed an example of one or more tangible, non-transitory computer-readable storage media, wherein the out-of-bounds behavior includes insertion of unexpected operations in a sequence.

There is further disclosed an example of one or more tangible, non-transitory computer-readable storage media, wherein the out-of-bounds behavior includes a sudden or unexpected change in CPU usage.

There is further disclosed an example of one or more tangible, non-transitory computer-readable storage media, wherein the out-of-bounds behavior includes a sudden or unexpected change in memory usage.

There is further disclosed an example of one or more tangible, non-transitory computer-readable storage media, wherein the out-of-bounds behavior includes access to an unexpected URL by the user application.

There is also disclosed an example computer-implemented method of detecting tampering with a local application, comprising: establishing a network interface with a detection proxy of a client device; receiving from the detection proxy telemetry data related, at least in part, to an application of the client device's access to remote features; analyzing the telemetry data; determining from the telemetry data that the application of the client device exhibits out-of-bounds behavior; and alerting a reporting authority of the out-of-bounds behavior.

There is further disclosed an example method, wherein alerting a reporting authority comprises alerting a security agent on the endpoint.

There is further disclosed an example method, wherein alerting a reporting authority comprises alerting an ISV responsible for the application.

There is further disclosed an example method, wherein the out-of-bounds behavior includes the use of a debugger.

There is further disclosed an example method, wherein the out-of-bounds behavior includes out-of-bounds timing between API calls.

There is further disclosed an example method, wherein the out-of-bounds behavior includes out-of-sequence access to remote APIs or resources.

There is further disclosed an example method, wherein the out-of-bounds behavior includes omission of expected operations in a sequence.

There is further disclosed an example method, wherein the out-of-bounds behavior includes insertion of unexpected operations in a sequence.

There is further disclosed an example method, wherein the out-of-bounds behavior includes a sudden or unexpected change in CPU usage.

There is further disclosed an example method, wherein the out-of-bounds behavior includes a sudden or unexpected change in memory usage.

There is further disclosed an example method, wherein the out-of-bounds behavior includes access to an unexpected URL by the user application.

There is further disclosed an example apparatus comprising means for performing the method of a number of the above examples.

The is further disclosed an example apparatus, wherein the means for performing the method comprise a processor and a memory.

The is further disclosed an example apparatus, wherein the memory comprises machine-readable instructions that, when executed, cause the apparatus to perform the method of a number of the above examples.

The is further disclosed an example apparatus, wherein the apparatus is a computing system.

There is further disclosed an example of at least one computer-readable medium comprising instructions that, when executed, implement a method or realize an apparatus as illustrated in a number of the above examples.

What is claimed is:

1. A computing apparatus, comprising:
   a hardware platform comprising a processor and a memory;
   a user application; and
   instructions encoded within the memory to instruct the processor to:
      provide telemetry probes to collect telemetry about use of the user application;
      provide a detection proxy to collect a usage profile from the telemetry probes,
   wherein the detection proxy comprises a unidirectional forwarder function for the telemetry data;
   forward the usage profile to a detection cloud service;
   receive from the detection cloud service a detection message that the usage profile deviates from a heuristic usage baseline for the user application;
   take remedial action responsive to the detection message; and
   provide an anti-malware engine, wherein the detection proxy cooperates with anti-malware engine to detect malicious modification of the user application through changes to behavior patterns.

2. The computing apparatus of claim 1, wherein the user application includes an internal anti-tampering mechanism.

3. The computing apparatus of claim 1, wherein the detection proxy performs little or no processing on the telemetry data before forwarding.

4. The computing apparatus of claim 1, wherein the detection proxy includes logic to block telemetry from known bad telemetry sources.

5. The computing apparatus of claim 1, wherein the telemetry data comprise network traffic request data.

6. The computing apparatus of claim 5, wherein the traffic request data comprise request type, request order, and request timing.

7. The computing apparatus of claim 5, wherein the traffic request data comprise source internet protocol (IP) address or destination IP address.

8. The computing apparatus of claim 1, wherein the telemetry data include execution environment data.

9. The computing apparatus of claim 8, wherein the execution environment data include CPU load, memory footprint, battery charge value, battery charging state, free local storage, network latency, bandwidth, time of day, date, or geographic location.

10. The computing apparatus of claim 1, wherein the detection proxy is to provide passive monitoring of the user application's network usage.

11. The computing apparatus of claim 1, wherein the detection proxy is to provide continuous monitoring of the user application.

12. One or more tangible, non-transitory computer-readable storage media having stored thereon executable instructions to instruct a processor to:
   install telemetry probes for a local application's access to a remote application programming interface (API), the telemetry probes including probes for application sequence and time between actions;
   install an application backend for the local application, the application backend comprising a detection engine, the detection engine comprising instructions to record and forward a usage profile, based at least in part on the telemetry about the remote API calls, to a detection cloud service, wherein the application backend comprises a unidirectional forwarder function for the telemetry data;
   receive from the detection cloud service a tampering notification, the tampering notification including information that the usage profile deviates from a heuristic model for the application;
   provide an anti-malware engine, wherein the application backend cooperates with anti-malware engine to detect malicious modification of the user application through changes to behavior patterns; and act on the tampering notification.

13. The one or more tangible, non-transitory computer-readable media of claim 12, wherein the local application is a game, financial application, or medical application.

14. The one or more tangible, non-transitory computer-readable media of claim 12, wherein the local application includes at least one paid feature, and wherein the tampering notification indicates that the application reached the paid feature without appropriate remuneration.

15. The one or more tangible, non-transitory computer-readable media of claim 12, wherein the telemetry probes comprise application programming interface (API) hooks.

16. A server apparatus, comprising: hardware platform comprising
   a processor and a memory;
   a network interface; and
   instructions encoded within the memory to instruct the processor to:
      receive, from a detection proxy of an endpoint comprising a unidirectional forwarder for telemetry data, telemetry data related to a user application of the endpoint's use of one or more remote application programming interfaces (APIs), the telemetry including information about a sequence of API calls and time between API calls;
      compare the telemetry data to a heuristic model of expected behavior for the user application;
      determine, based at least in part on the comparison, that the user application exhibits behavior deviant from the heuristic model; and
      send a notification to the endpoint that the user application may be compromised, the notification for use by an anti-malware engine of the endpoint that is to detect malicious modification of the user application through changes to behavior patterns.

17. The server apparatus of claim 16, wherein sending the notification comprises sending the notification to a third-party cloud service that provides the one or more remote APIs.

18. The server apparatus of claim 16, wherein sending the notification comprises notifying a security agent on the endpoint.

19. The one or more tangible, non-transitory computer readable media of claim 12, wherein the application backend includes logic to block telemetry from known bad telemetry sources.

20. The one or more tangible, non-transitory computer readable media of claim 12, wherein the telemetry data comprise network traffic request data.

* * * * *